United States Patent
Kamimura et al.

(10) Patent No.: US 10,462,356 B2
(45) Date of Patent: Oct. 29, 2019

(54) RANGE IMAGE CAMERA, RANGE IMAGE CAMERA SYSTEM, AND CONTROL METHOD OF THEM

(71) Applicant: Hitachi, Ltd., Tokyo (JP)

(72) Inventors: Toshio Kamimura, Tokyo (JP);
Akinobu Watanabe, Tokyo (JP);
Yasuyuki Mimatsu, Tokyo (JP);
Katsuyuki Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/167,736

(22) Filed: Oct. 23, 2018

(65) Prior Publication Data

US 2019/0132509 A1 May 2, 2019

(30) Foreign Application Priority Data

Nov. 2, 2017 (JP) .................. 2017-212336

(51) Int. Cl.
*H04N 5/232* (2006.01)
*G06T 7/521* (2017.01)
*G01S 11/00* (2006.01)

(52) U.S. Cl.
CPC .......... *H04N 5/23216* (2013.01); *G01S 11/00* (2013.01); *G06T 7/521* (2017.01); *H04N 5/232* (2013.01); *H04N 5/23238* (2013.01); *G06T 2207/10028* (2013.01)

(58) Field of Classification Search
CPC ............ H04N 5/23216; H04N 5/23238; G06T 7/521; G06T 2207/10028
See application file for complete search history.

(56) References Cited

U.S. PATENT DOCUMENTS

| | | | |
|---|---|---|---|
| 2008/0225121 A1* | 9/2008 | Yoshida ........... | G08B 13/19641 348/159 |
| 2010/0097470 A1* | 4/2010 | Yoshida ........... | G08B 13/19641 348/159 |
| 2012/0268606 A1* | 10/2012 | Liu ........................ | G06Q 10/06 348/159 |
| 2014/0098223 A1* | 4/2014 | Murata ................ | G01B 11/026 348/135 |
| 2015/0098623 A1* | 4/2015 | Shimizu ............. | G06K 9/00805 382/104 |
| 2015/0365602 A1* | 12/2015 | Kawamura ............. | H04N 7/18 348/333.12 |

(Continued)

FOREIGN PATENT DOCUMENTS

JP 2012-247226 A 12/2012

*Primary Examiner* — Oschta I Montoya

(74) *Attorney, Agent, or Firm* — Mattingly & Malur, PC

(57) ABSTRACT

The present invention provides a quantification technique of an installation state of a range image camera in a range image camera system provided with a plurality of range image cameras. In the range image camera system provided with the plurality of range image cameras and the range image camera cooperative processing device for cooperatively processing the plurality of range image cameras, the installation information of the range image cameras is generated from a range distribution of the range image photographed by the range cameras and a luminance distribution of the luminance image to photograph the reflected light of the irradiation light of the range image camera arranged adjacently.

6 Claims, 16 Drawing Sheets

(56) References Cited

U.S. PATENT DOCUMENTS

| | | | |
|---|---|---|---|
| 2016/0178512 A1* | 6/2016 | Hall | G01N 21/4738 |
| | | | 348/135 |
| 2016/0292484 A1* | 10/2016 | Hachimura | G06K 7/1443 |
| 2017/0167965 A1* | 6/2017 | Wakui | C12Q 1/02 |
| 2019/0110033 A1* | 4/2019 | Nakajima | G03B 21/147 |

* cited by examiner

F I G. 1
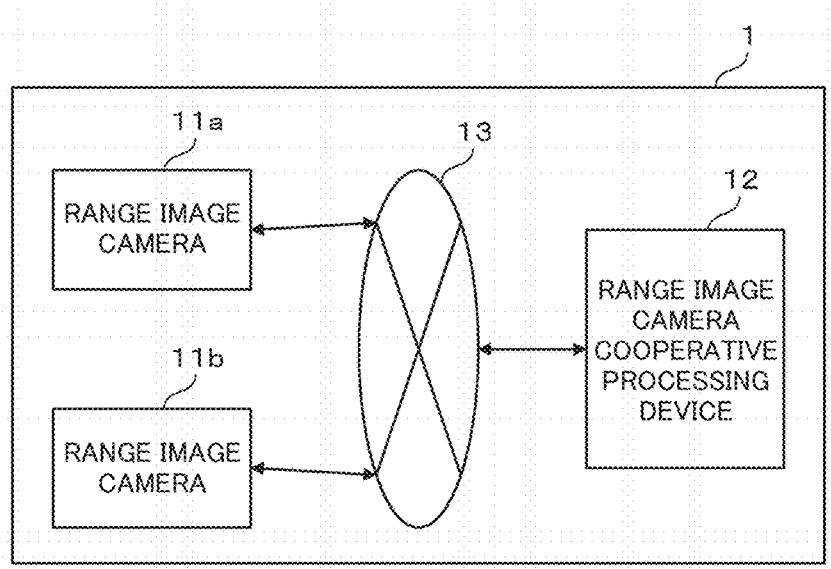
F I G. 2
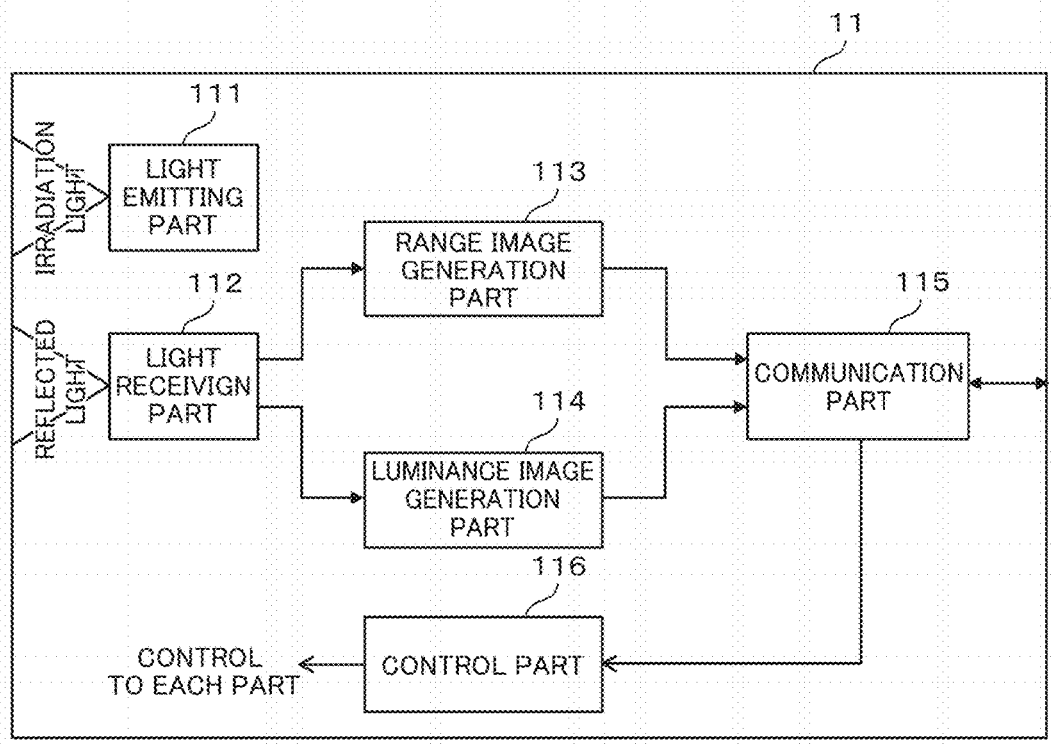

RANGE IMAGE CAMERA, RANGE IMAGE CAMERA SYSTEM, AND CONTROL METHOD OF THEM

CROSS-REFERENCE TO RELATED APPLICATION

The present application claims priority from Japanese application JP 2017-212336, filed on Nov. 2, 2017, the contents of which is hereby incorporated by reference into this application.

BACKGROUND

The present invention relates to an installation technique of a range image camera.

Japanese Unexamined Patent Publication No. 2012-247226 is disclosed as an installation technique of a range image camera.

In Japanese Unexamined Patent Publication No. 2012-247226 describes that it provides a range image camera and a range image synthesizing method capable of acquiring a range image having a wider angle of view than an angle of view of a single photographing part and having a high range accuracy.

Japanese Unexamined Patent Publication No. 2012-247226 provides the following technique: that is, in a range image camera system provided with a plurality of range image cameras arranged in such a way that range images to be acquired overlap each other, by subjecting range images acquired by the respective camera units to processing of searching, selecting, computing, replacing, and synthesizing, there can be acquired a range image having a wider angle of view than an angle of view of a single photographing part and having a high range accuracy. However, as for an installation of the plurality of camera units, Japanese Unexamined Patent Publication No. 2012-247226 does not consider a checking operation of an installation state (position and direction) of the plurality of camera units. For this reason, there is presented such a problem that an installation operation of the plurality of camera units will require a troublesome repetitive operation including an installation state checking operation by a visual check of the range image and an adjustment operation based on a qualitative shift of the installation state acquired by the visual check.

SUMMARY OF THE INVENTION

In view of the problem described above, an object of the present invention is to provide a quantification technique of an installation state of a range image camera in a range image camera system provided with a plurality of range image cameras.

In view of the background art described above, as an example of the present invention, the present invention is a range image camera including: a light emitting part that emits an irradiation light to a photographing space; a light receiving part that receives a reflected light of the photographing space; a range image generation part that generates a range image from a time difference between a light emitting timing of the irradiation light by the light emitting part and a light receiving timing of the reflected light by the light receiving part; a luminance image generation part that generates a luminance image from an intensity of the reflected light by the light receiving part; and a control part that controls the light emitting part, the light receiving part, the range image generation part, and the luminance image generation part, wherein the control part gives at least one instruction of an image generation execution of: an instruction of a light emission execution to the light emitting part; an instruction of a light reception execution to the light receiving part; an instruction of a range image generation execution to the range image generation part; and an instruction of a luminance image generation execution to the luminance image generation part, as an image generation execution mode. Here, the control part is composed so as to have at least one mode of: an image generation execution mode for generating installation information; and a light emission execution mode for generating installation information, and so as to give at least one instruction of: an instruction of a light emission stop to the light emitting part; an instruction of a light reception execution to the light receiving part; and an instruction of a luminance image generation execution to the luminance image generation part, as the image generation execution mode for generating installation information, and so as to give at least one instruction of: an instruction of a light emission execution to the light emitting part; an instruction of a light reception stop to the light receiving part; and an instruction of a luminance image generation stop to the luminance image generation part, as the light emission execution mode for generating installation information.

According to the present invention, in a range image camera system provided with the plurality of range image cameras, it is possible to provide a quantification technique of an installation state of the range image cameras.

BRIEF DESCRIPTION OF THE DRAWINGS

FIG. 1 is a configuration block diagram of a range image camera system in an embodiment 1;

FIG. 2 is a configuration block diagram of a range image camera in the embodiment 1;

DETAILED DESCRIPTION OF THE PREFERRED EMBODIMENTS

Figure 3:
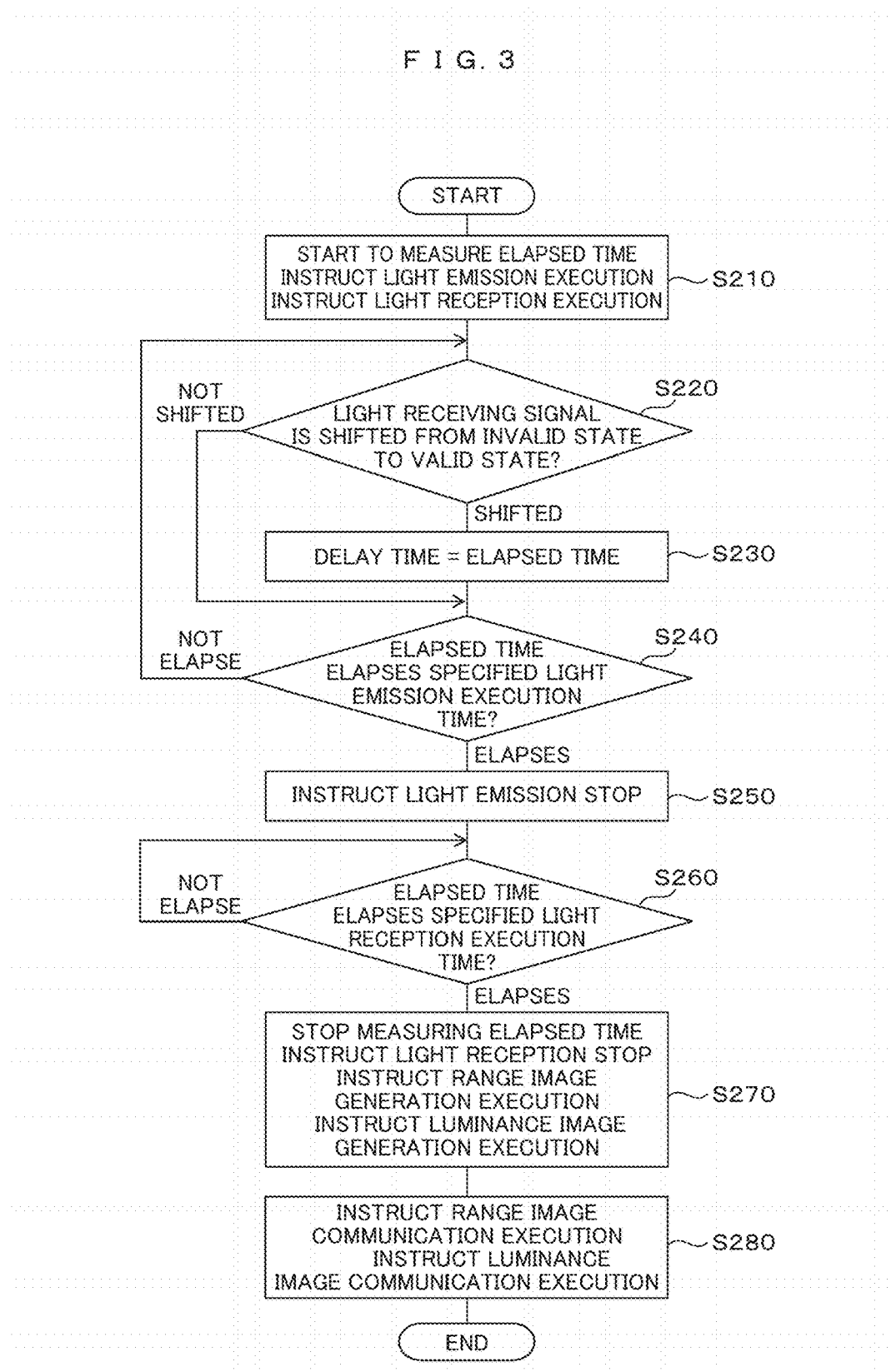
FIG. 3 is an operation flow chart at a time of an image generation execution mode of the range image camera system in the embodiment 1.

Embodiments of the present invention will be described with reference to the figures.

FIG. 1 is a configuration block diagram of a range image camera system in a present embodiment. In FIG. 1, a range image camera system 1 is provided with two range image cameras 11a, 11b (hereinafter collectively referred to as 11), a range image camera processing device 12 that cooperatively processes the two range image cameras 11, and a network 13 that makes communication between the two range image cameras 11 and the range image camera processing device 12.

Further, the range image camera processing device 12 gives a mode instruction of an image generation execution mode that generates an image to the two range image cameras 11 (11a and 11b) as a cooperative image generation execution mode that generates a cooperative image such as a mode of synthesizing images generated by the two range image cameras 11.

Still further, as a special feature of the range image camera system in the present embodiment, the range image camera processing device 12 has two modes of a first cooperative installation information generation execution mode and a second cooperative installation information generation execution mode as a cooperative installation information generation execution mode for generating cooperative installation information, and gives a mode instruction of the image generation execution mode to the range image cameras 11 (11a, 11b) as the first cooperative installation information generation execution mode, and gives a mode instruction of an image generation execution mode for generating installation information, which generates an image for generating installation information to one of the range image cameras 11 (11a or 11b), as the second cooperative installation information generation execution mode. Here, in the first cooperative installation information generation execution mode, first installation information of the range image cameras 11 (11a, 11b) is generated from at least one image of a range image and an luminance image of the range image cameras 11 (11a, 11b) to instruct the image generation execution mode, and in the second cooperative installation information generation execution mode, second installation information of the range image cameras 11 (11a, 11b) to instruct the image generation execution mode for generating installation information is generated from the luminance image of the range image cameras 11 (11a, 11b) to instruct the image generation execution mode for generating installation information. Although the first installation information and the second installation information will be described later in detail, to put it simply, the first installation information is information of whether or not an installation position of a camera, which is generated from an image from a single range image camera, is shifted, and the second installation information is information of whether or not an installation position of a camera, which is generated from a cooperation of images from a plurality of range image cameras, is shifted.

In this regard, the image generation execution mode of the range image cameras 11, the image generation execution mode for generating installation information, the cooperative image generation execution mode of the range image camera system 1, the first cooperative installation information generation execution mode and the second cooperative installation information generation execution mode of the cooperative installation information generation execution mode will be described later in detail.

FIG. 2 is a configuration block diagram of the range image camera in the present embodiment. In FIG. 2, the range image camera 11 is provided with: a light emitting part 111 that emits an irradiation light to a photographing space; a light receiving part 112 that receives a reflected light of the photographing space; a range image generation part 113 that generates a range image from a delay time from a light emitting timing of the irradiation light by a light emitting part to a light receiving timing of a reflected light by the light receiving; a luminance image generation part 114 that generates a luminance image from an intensity of the reflected light by the light receiving part; a communication part 115 that communicates control information, the range image, and the luminance image with an external portion; and a control part 116 that controls the light emitting part 111, the light receiving part 112, the range image generation part 113, the luminance image generation part 114, and the communication part 115. In this regard, the light receiving part 112 has a plurality of sensors in a two-dimensional way and generates two-dimensional information of a delay time and the intensity of the reflected light.

Further, as the image generation execution mode, the control part 116 gives an instruction of executing a light emission to the light emitting part 111, an instruction of executing a light reception to the light receiving part 112, an instruction of executing a range image generation to the range image generation part 113, and an instruction of executing a luminance image generation to the luminance image generation part 114.

Still further, as a special feature of the range image camera in the present embodiment, as the image generation execution mode for generating installation information, the control part 116 gives an instruction of stopping the light emission to the light emitting part 111, an instruction of a light reception execution to the light receiving part 112, and an instruction of a luminance image generation execution to the luminance image generation part 114.

Figure 4:
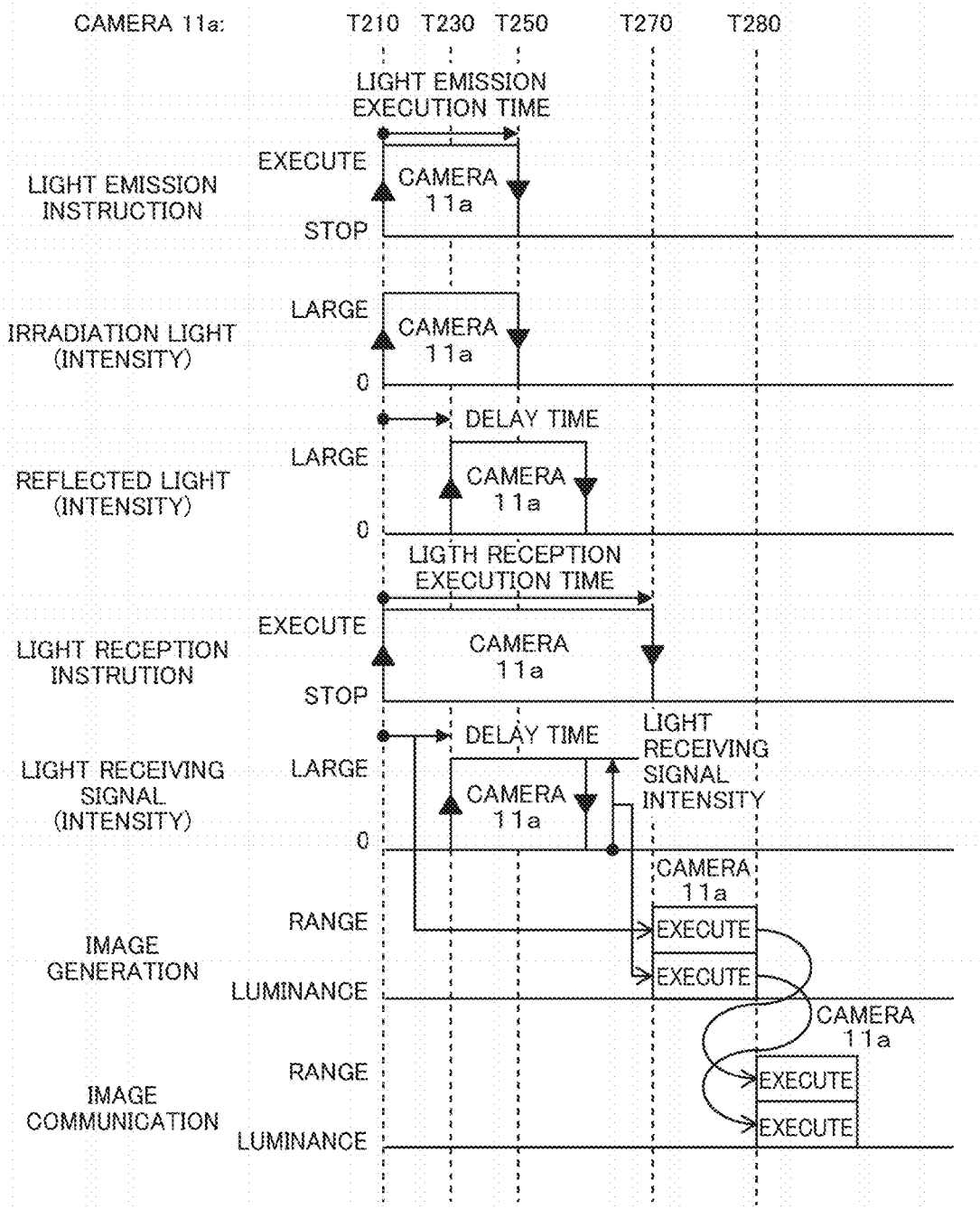
FIG. 4 is an operation timing chart at the time of the image generation execution mode of the range image camera system in the embodiment 1.

Next, an operation of the image generation execution mode of the range image camera in the present embodiment will be described. FIG. 3 and FIG. 4 are an operation flow chart and an operation timing chart at the time of the image generation execution mode of the range image camera in the present embodiment.

Here, an operation flow and an operation timing are controlled by the control part 116 that receives an instruction of a mode from the range image camera cooperative processing device 12 via the communication part 115. Further, so as to show an operation timing in FIG. 4 corresponding to each operation in FIG. 3, the same numbers corresponding to signs S210 to S280 given to each of the operation flows shown in FIG. 3 will be given to each of the operation timings, that is, will be denoted as signs T210 to T280. Still further, in FIG. 4, as various kinds of state changes caused by operation flows shown in FIG. 3 will be shown the irradiation light and the reflected light in the photographing space and also a state change in a light receiving signal generated by the light receiving part. In this regard, in FIG. 4 will be shown a case where the range image camera 11a is operated. Still further, the operation flow chart and the operation timing chart show one image generation operation of the image generation execution mode, that is, shows an idea of generating an image of 1 pixel and may be realized by the other method.

In S210 (T210), a measurement of an elapsed time is started and a light emission execution is instructed to the light emitting part 111 and a light reception execution is instructed to the light receiving part 112.

In S220, it is determined whether or not the light receiving signal generated by the light receiving part 112 is shifted from an invalid state to a valid state, and in a case where the light receiving signal is shifted to the valid state, the process proceeds to S230, whereas in a case where the light receiving signal is not shifted to the valid state, the process proceeds to S240.

In S230 (T230), an elapsed time at that timing is made a delay time from a light emission timing of the irradiation light by the light emitting part 111 to a light reception timing of the reflected light by the light receiving part 112.

In S240 (T240), it is determined from the elapsed time at that timing whether or not a specified light emission execution time by the light emitting part 111 elapses, and in a case where it is determined that the specified light emission execution time elapses, the process proceeds to S250, whereas in a case where it is determined that the specified light emission execution time does not elapse, the process returns to S220.

In S250 (T250), a light emission stop is instructed to the light emitting part 111.

In S260, it is determined from the elapsed time at that timing whether or not a specified light reception execution time by the light receiving part 112 elapses, and in a case where it is determined that the specified light reception execution time elapses, the process proceeds to S270, whereas in a case where it is determined that the specified light reception execution time does not elapse, the process returns to S260.

In S270 (T270), a measurement of the elapsed time is stopped and a light reception stop is instructed to the light receiving part 112 and a range image generation execution is instructed to the range image generation part 113 and a luminance image generation execution is instructed to the luminance image generation part 114.

In S280 (T280), a range image communication execution and a luminance image communication execution are instructed to the communication part 115.

Figure 5:
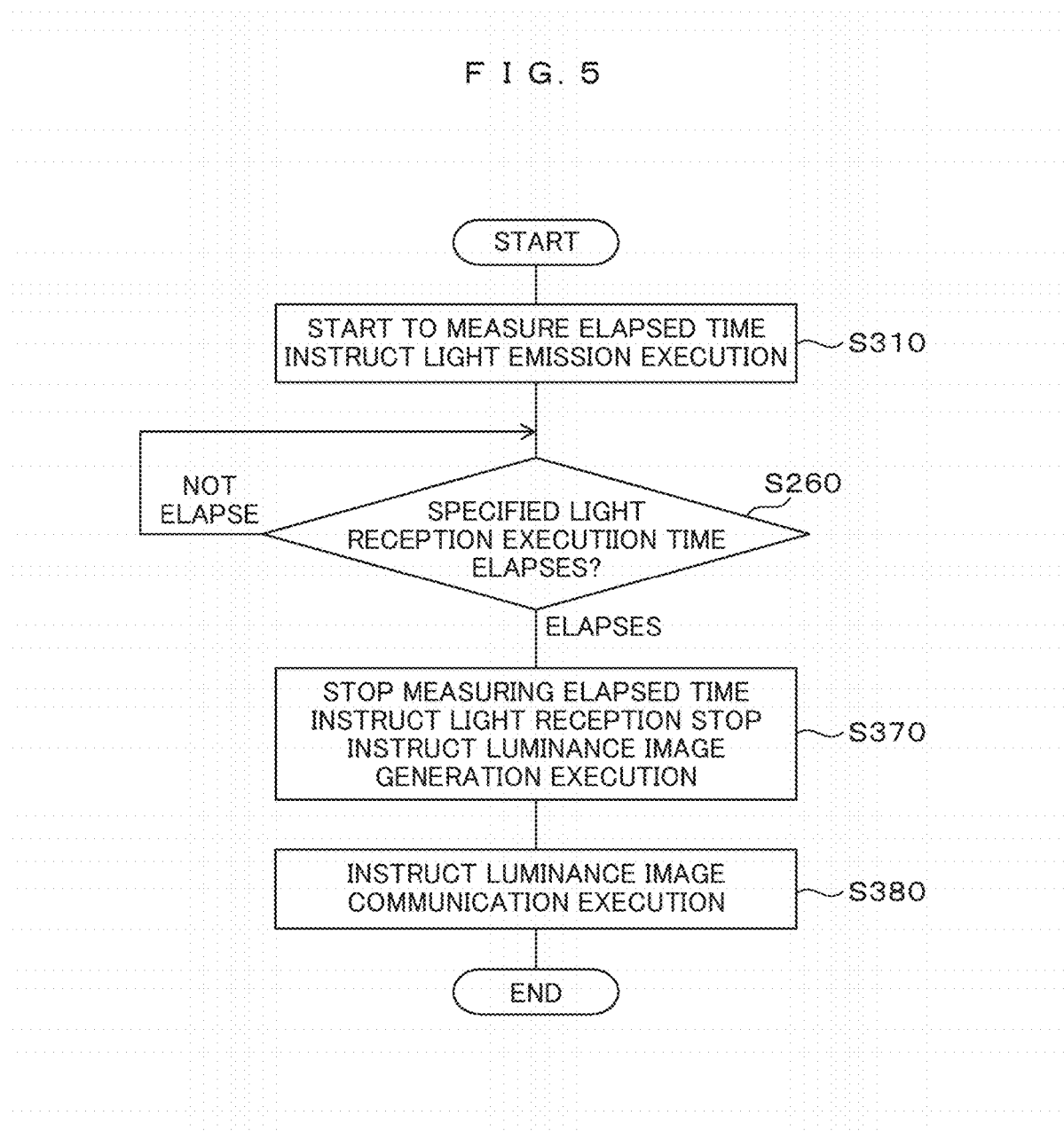
FIG. 5 is an operation flow chart at a time of an image generation execution mode of generating installation information of the range image camera in the embodiment 1.
Figure 6:
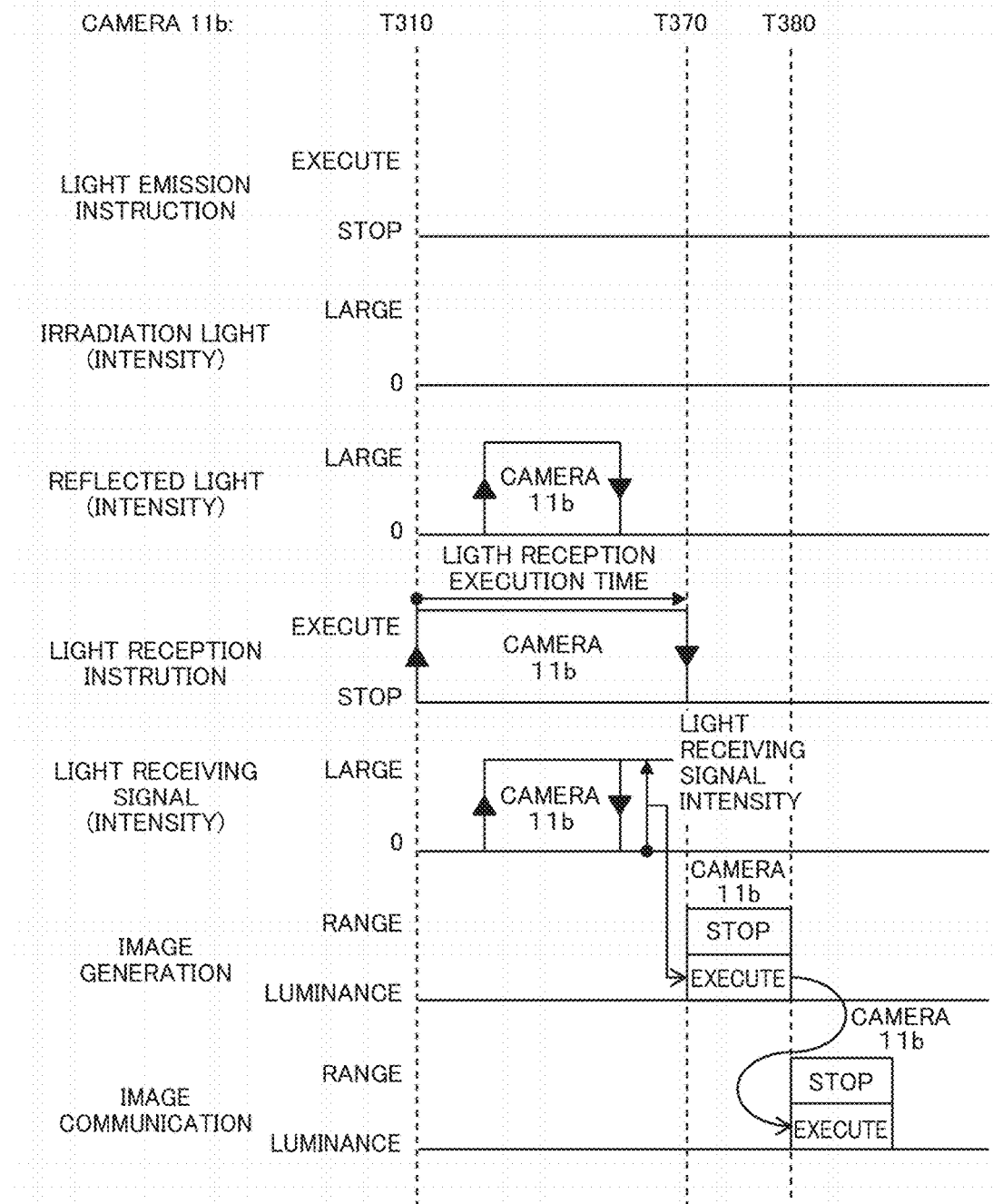
FIG. 6 is an operation timing chart at the time of the image generation execution mode of generating installation information of the range image camera in the embodiment 1.

Next, an operation of the image generation execution mode for generating installation information of the range image camera in the present embodiment will be described. FIG. 5 and FIG. 6 are an operation flow chart and an operation timing chart at the time of the image generation execution mode of for generating installation information of the range image camera in the present embodiment.

Here, the image generation execution mode for generating installation information of the range image camera is used in the second cooperative installation information generation execution mode of the cooperative installation information generation execution mode as the range image camera system and generates installation information of relative installation positions of these range image cameras according to an overlapping state of the range image camera, which is an object to be instructed in the image generation execution mode for generating installation information, and the other range image camera arranged adjacently to the range image camera in the photographing space in the range image camera system. This installation information is information for urging a worker of installing the range image camera to adjust the relative installation positions of the range image cameras.

Specifically, a reflected light by an irradiation light emitted as the image generation execution mode in an adjacent range image camera is received as a reflected light of a photographing space of the range image camera to be objected and generates a luminance image from an intensity of the reflected light. A region in which the intensity is significant in this luminance image can be confirmed as an overlapping space where a photographing space of the range image camera to be objected and a photographing space of the adjacent range image camera overlap each other. In this regard, the second cooperative installation information generation execution mode of the cooperative installation information generation execution mode as the range image camera system will be described later in detail.

In other words, the image generation execution mode for generating installation information of the range image camera is different from the image generation execution mode described above in that, in the image generation execution mode for generating installation information, an operation related to a light emission and an operation related to a range image generation are not made.

In this regard, FIG. 6 shows a case where the range image camera 11b is at the time of the image generation execution mode for generating installation information, and as various kinds of state changes, FIG. 6 shows also state changes of the reflected light in the photographing space of the range image camera 11b by the irradiation light emitted by the range image camera arranged adjacently (not shown in the figure), for example, the range image camera 11a and state changes of the light receiving signal generated by the light receiving part according to the operation flow shown in FIG. 5. Further, the present operation flow chart and the present operation timing chart show an idea of one image generation operation, that is, an image generation of one pixel of the image generation execution mode for generating installation information and may be realized by the other method.

In S310 (T310), a measurement of an elapsed time is started and a light reception execution is instructed to the light receiving part 112. Here, when compared with S210 in the operation flow chart at the time of the image generation execution mode shown in FIG. 3, S310 (T310) is different from S210 (T210) in that a light emission is not executed but that only a light reception is executed.

S260 is the same as S260 in FIG. 3 and it is determined whether or not a specified light reception execution time elapses in the light receiving part 112.

In S370 (T370), the measurement of the elapsed time is stopped and a light reception stop is instructed to the light receiving part 112, and a luminance image generation execution is instructed to the luminance image generation part 114. Here, when compared with S270 of the operation flow chart at the time of the image generation execution mode shown in FIG. 3, S370 (T370) is different from S270 (T270) in that the range image generation is not executed but that only the luminance image generation is executed.

In S380 (T380), the communication part 115 is instructed to execute a luminance image communication.

Figure 7:
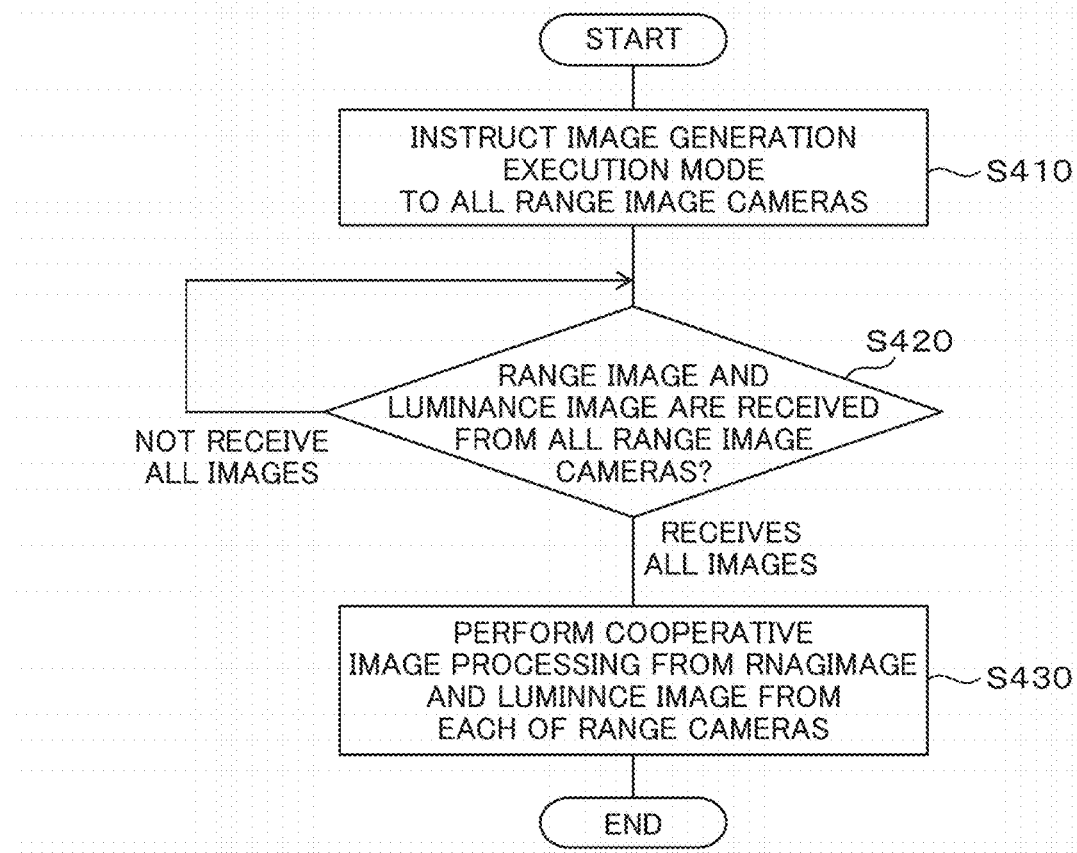
FIG. 7 is an operation flow chart at a time of a cooperative image generation execution mode of the range image camera system in the embodiment 1.
Figure 8:
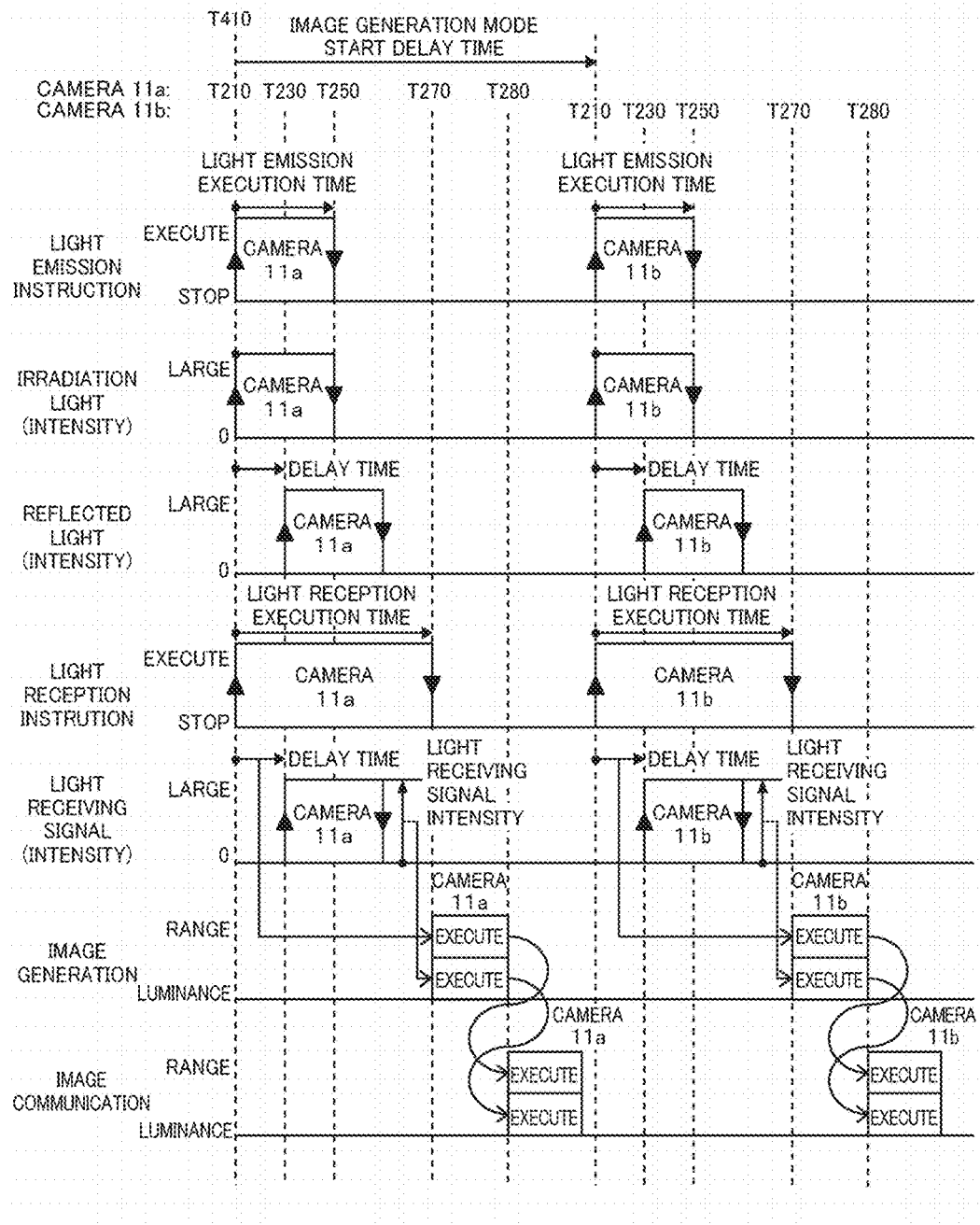
FIG. 8 is an operation timing chart at the time of the cooperative image generation execution mode of the range image camera system in the embodiment 1.

Next, an operation of the cooperative image generation execution mode of the range image camera system in the present embodiment will be described. FIG. 7 and FIG. 8 are an operation flow chart and an operation timing chart at the time of the cooperative image generation execution mode of the range image camera system in the present embodiment.

Here, the present operation flow chart and the present operation timing chart are controlled by the range image camera cooperative processing device 12.

In S410 (T410), the image generation execution mode is instructed to all range image cameras 11 (11a and 11b).

In this regard, in S410 (T410), each of all range image cameras 11 (11a and 11b) that receives an instruction of the image generation execution mode needs to prevent errors from being caused in a delay time and an intensity of the light receiving signal by an interference of the reflected lights by their respective irradiation lights. For this reason, each of the range image cameras 11a, 11b gives an instruction of a light reception execution to the light receiving part 112 at a specified timing in such a way that a period in which a light emission execution is instructed to the light emitting part 111 does never even partially overlap a period in which a light reception execution is instructed to the light receiving part 112. For example, a starting timing of the image generation mode operation of the range image camera 11a is shifted from a starting timing of the image generation mode operation of the range image camera 11b by a delay time of starting the image generation mode described in FIG. 8.

In S420, it is determined whether or not the range images and the luminance images of all range image cameras 11 (11a and 11b) are received, and in a case where all images are received, the process proceeds to S430, whereas in a case where all images are not received, the process returns to S420.

In S430, a cooperative image processing of the range image and the luminance image from the respective range image cameras 11 (11a and 11b) is performed. In this regard, the cooperative image processing of the range image and the luminance image is, for example, a synthesizing processing of the range image and the luminance image but may be other processing.

Figure 9:
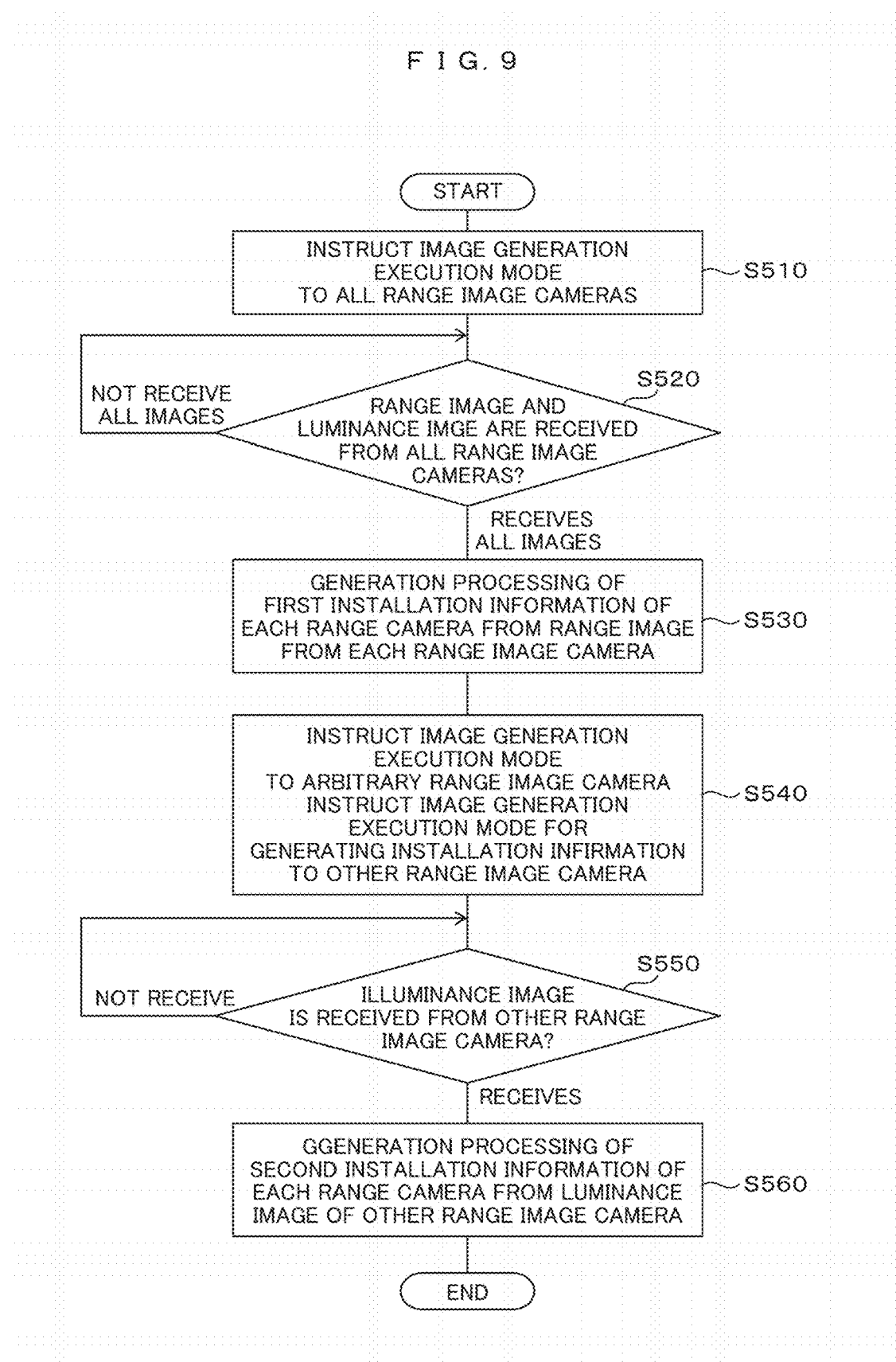
FIG. 9 is an operation flow chart at a time of a cooperative installation information generation execution mode of the range image camera system in the embodiment 1.
Figure 10:
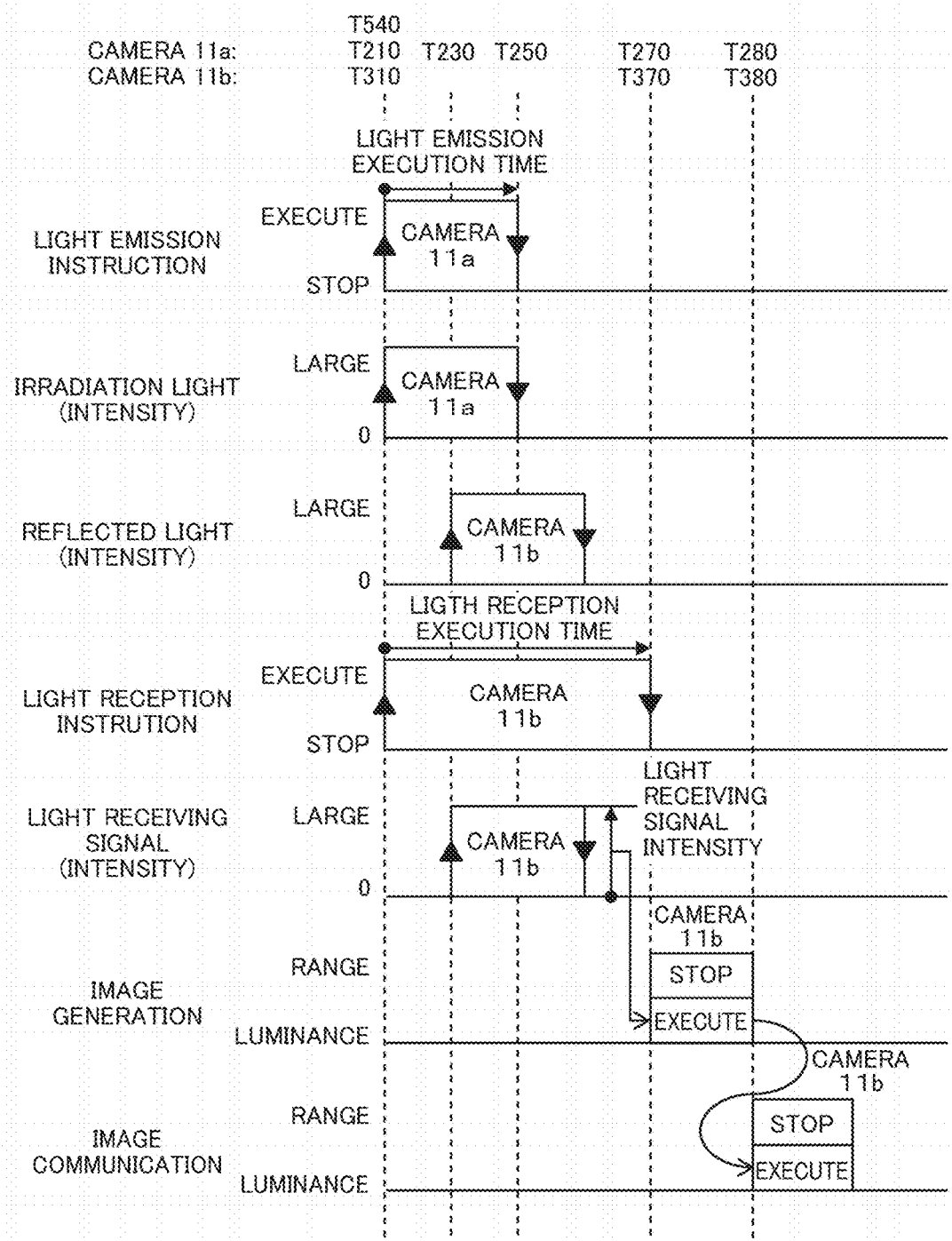
FIG. 10 is an operation timing chart of a second cooperative installation information generation execution mode of the range image camera system in the embodiment 1.

Next, an operation of the cooperative installation information generation execution mode of the range image camera system in the present embodiment will be described. FIG. 9 and FIG. 10 are an operation flow chart and an operation timing chart at the time of the cooperative installation information generation execution mode of the range image camera system in the present embodiment.

In FIG. 9, S510 to S530 are operations of the first cooperative installation information generation execution mode, and S540 to S560 are operations of the second cooperative installation information generation execution mode. The operation timing chart of the first cooperative installation information generation execution mode is the same as the operation timing chart shown in FIG. 8 except that a reference sign T410 of an instruction timing of the image generation execution mode from the range image cooperative processing device is changed to T510 corresponding to S510 shown in FIG. 9 and hence will be omitted. Further, FIG. 10 is an operation timing chart of the second cooperative installation information generation execution mode from S540 to S560 shown in FIG. 9, and is obtained by adding an instruction timing T540 of the image generation execution mode and the image generation execution mode for generating installation information from the range image camera cooperative processing device to a combination of the operation timing chart shown in FIG. 4 and the operation timing chart shown in FIG. 6 and by omitting a portion of processing of the range image camera instructed in the image generation execution mode.

S510 (T510) and S520 are same as S410 (T410) and S420 shown in FIG. 7 and FIG. 8.

In S530, a generation processing of first installation information of each of the range image cameras 11 (11a and 11b) is performed from the range image from each of the range image cameras 11 (11a and 11b). In this regard, the generation processing of the first installation information of each of the range image cameras 11 (11a and 11b) in S530 will be described later in detail.

In S540 (T540), the image generation execution mode is instructed to an arbitrary range image camera 11 (for example, 11a), whereas the image generation execution mode for generating installation information is instructed to the other range image camera 11 (for example, 11b).

In this regard, in S540 (T540), a reflected light by an irradiation light emitted by the range image camera 11 (for example 11a) to instruct the image generation execution mode is received as the reflected light in the photographing space of the range image camera (for example, 11b) to instruct an image generation execution mode for generating installation information and generates a luminance image from an intensity of the reflected light. Hence, a starting timing of an operation of an image generation mode of the range image camera 11 (for example, 11a) to instruct the image generation execution mode is not shifted from, that is, is the same as a starting timing of an operation of the image generation execution mode for generating installation information of the range image camera 11 (for example, 11b) to instruct the image generation execution mode for generating installation information.

In S550, it is determined whether or not the luminance image of the range image camera 11 (for example, 11a) to instruct the image generation execution mode for generating installation information is received, and in a case where it is determined that the luminance image is received, the process proceeds to S560, whereas in a case where it is determined that the luminance image is not received, the process returns to S550.

In S560, a generation processing of second installation information of the respective range image cameras 11 (11a and 11b) is performed from the luminance image of the range image camera 11 (for example, 11b) to instruct the image generation execution mode for generating installation information. In this regard, the generation processing of the second installation information of the respective range image cameras 11 (11a and 11b) in S560 will be described later in detail.

As described above, in the range image camera system provided with the plurality of range image cameras and the range image camera cooperative processing device for cooperatively processing the plurality of range image cameras, the installation information of the range image cameras is generated from a range distribution of the range image photographed by the range cameras and a luminance distribution of the luminance image to photograph the reflected light of the irradiation light of the range image camera arranged adjacently.

In this way, in the range image camera system provided with the plurality of range image cameras, it is possible to provide a quantification technique of an installation state of the range image cameras.

Embodiment 2

The present embodiment provides an example of a specific installation state of the range image camera in a range image camera system and describes a specific image regarding an operation of a generation processing of first installation information and an operation of a generation processing in an installation state in which the range image cameras are installed as intended and in an installation state in which the range image cameras are not installed as intended.

First, an example of the installation state in which the range image camera in the range image camera system is installed as intended will be described.

Figure 11A:
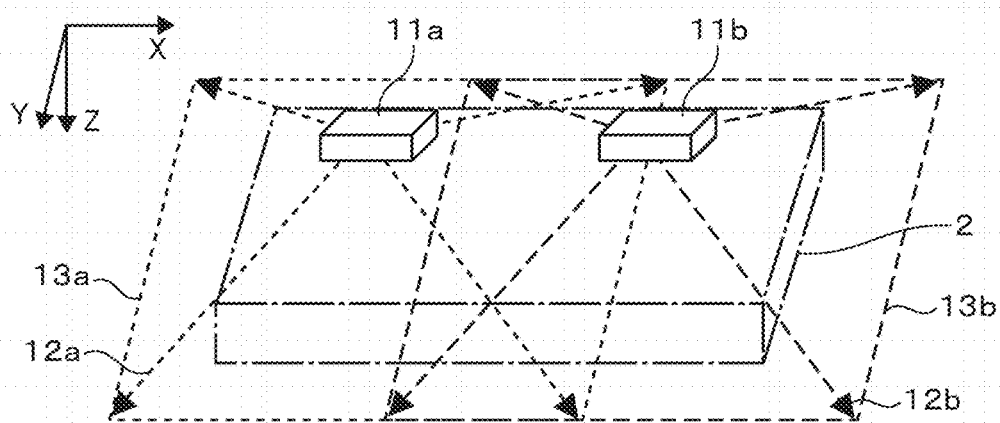
FIGS. 11(a)-11(c) are figures to show a photographing space of an installation state in which the range image cameras of a range image camera system in an embodiment 2 are installed as intended.
Figure 11B:
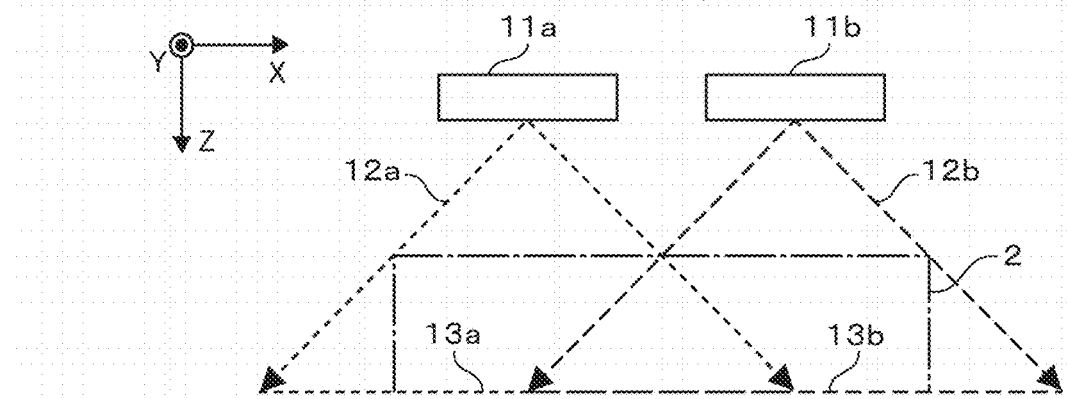
Figure 11C:
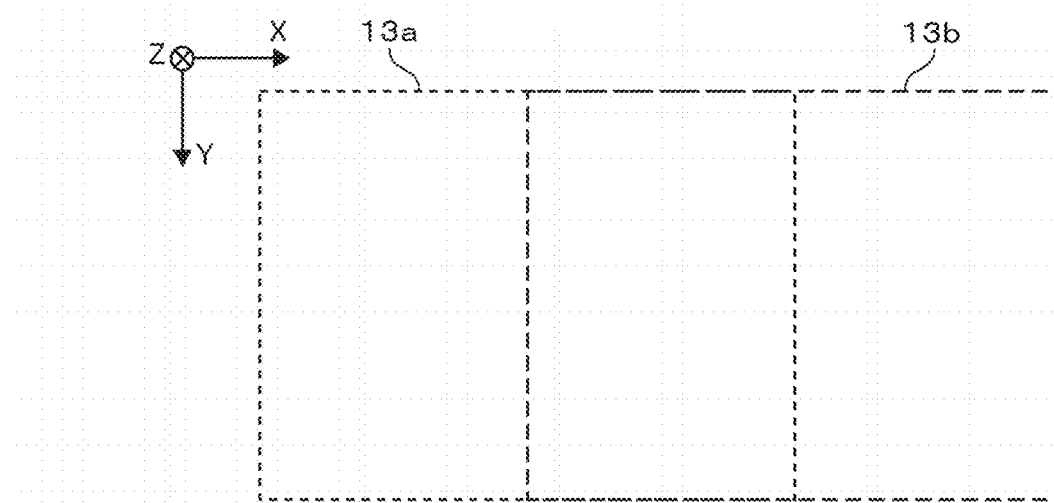

FIGS. 11(a)-11(c) are figures showing the photographing space of an installation state in which the range image cameras of the range image camera system in the present embodiment are installed as intended. FIG. 11(a) shows a perspective view, FIG. 11(b) shows a side view, and FIG. 11(c) shows a plan view.

Here, solid lines with arrows show X, Y, and Z axes in both of world space coordinates and camera space coordinates. Further, dotted lines and broken lines with arrows are an angle of view 12a of the range image camera 11a and an angle of view 12b of the range image camera 11b. Still further, parallelograms shown by dotted lines and broken lines are photographing planes 13a and 13b on a floor (not shown in the figure) of the range image cameras 11a and 11b. Hence, a space, which is surrounded by the dotted lines with arrows and by the broken lines with arrows and is surrounded by the parallelograms shown by the dotted lines and by the broken lines, becomes a photographing space of the range image cameras 11a and 11b (hereinafter denoted by a camera photographing space).

On the other hand, a rectangular parallelepiped shown by single dot and dash lines is a photographing space (hereinafter denoted by a system photographing space 2) of a person or the like that is intentionally caught in the range image camera system. Hence, a height in the system photographing space 2 (in a Z-axis direction) becomes, for example, a height of a finger from the floor when a standing person raises his hand.

Here, in FIGS. 11(a)-11(c), the system photographing space 2 is neither excessive nor deficient with respect to a region in which the angle of view 12a of the range image camera 11a and the angle of view 12b of the range image camera 11b overlap each other in terms of a space. In other words, there is formed an intended system photographing space 2.

As shown in FIGS. 11(a)-11(c), the range image camera system of the present embodiment has two range image cameras 11 (11a and 11b) installed. Further, these two camera photographing spaces form a relationship in which both are identical to each other in a vertical direction from a ceiling and in which both are moved parallel to each other by a specified distance in an X axis direction.

As for more specific installation states of the two range image cameras 11 (11a and 11b), in the installation positions in the world space coordinates, both Z positions are identical to each other and a position of a ceiling surface (not shown in the figure), both Y positions are same specified positions, and both X positions are specified positions which are separate from each other by a specified distance. Further, as for installation directions, all of an X axis, a Y axis, and a Z axis of the world space coordinates are identical in directions to those of the camera space coordinates.

Next, an operation of a generation processing of the first installation information in the range image camera system of the present embodiment will be described.

First, an operation of a generation processing of the first installation information in a case where the range image cameras 11 (11a and 11b) in the range image camera system of the present embodiment are installed as intended will be described.

Figure 12A:
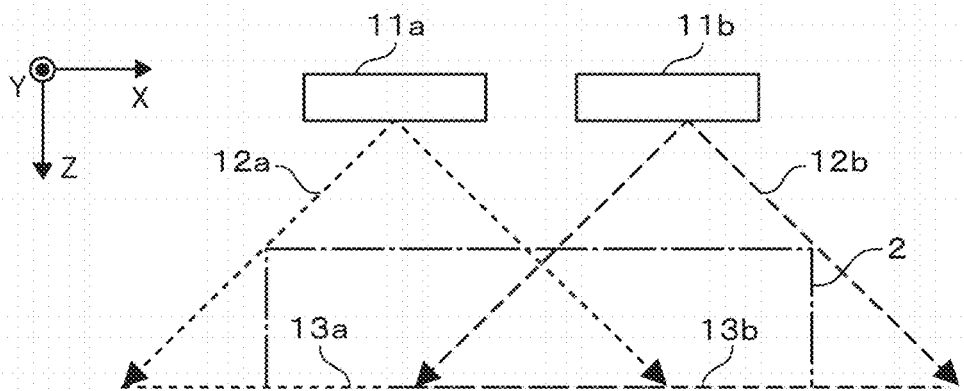
FIGS. 12(a)-12(c) are a side view of the photographing space and range images, respectively, in an installation state in which the range image cameras of a range image camera system in an embodiment 2 are installed as intended.
Figure 12B:
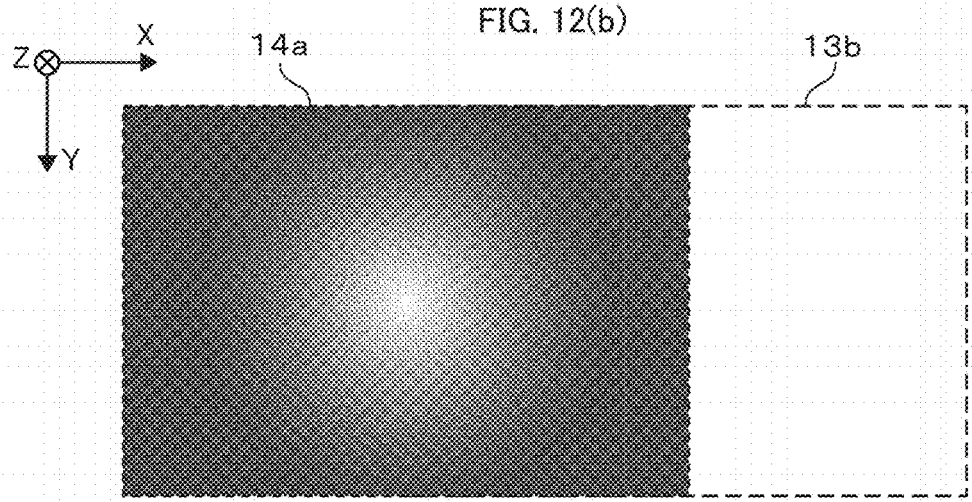
Figure 12C:
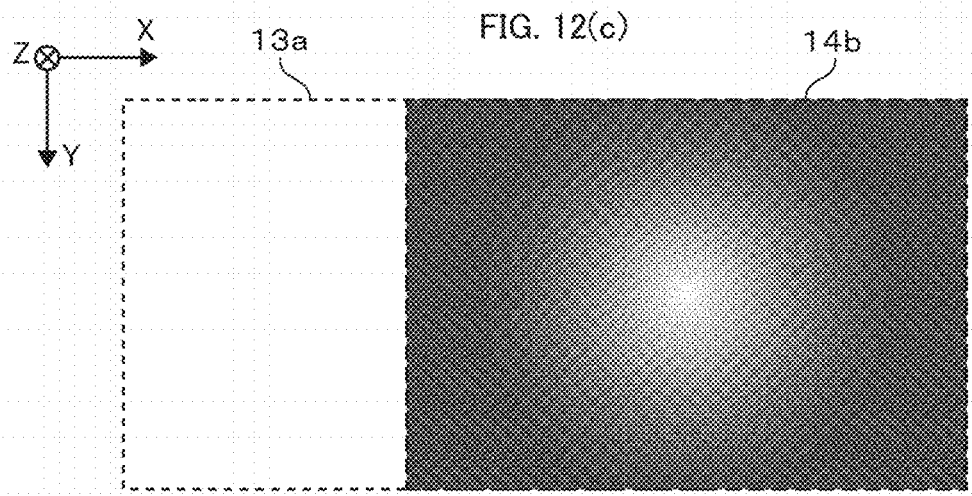

FIGS. 12(a)-12(c) are a side view of the photographing space and range images, respectively, in the installation state where the range image cameras 11 (11a and 11b) in the range image camera system of the present embodiment are installed as intended.

Here, FIG. 12(a) is a side view of the photographing space and FIGS. 12(b) and 12(c) are range images 14a and 14b of the range image cameras 11a and 11b. Further, the range images 14a and 14b are generated by an instruction of the image generation execution mode, respectively. Further, in the range images 14a and 14b in the figures, light and shade express short and long in a distance.

As shown in FIG. 12(a), the range image cameras 11a and 11b are installed as intended, so it can be seen that in both of the range images 14a and 14b, a distance is shortest at the center and that a distance become longer radially from the center (changes from light to shade in the figures).

In the S530 of the generation processing of the first installation information described above, the first installation information of the information of whether or not the range image cameras 11a and 11b are shifted from their intended positions are generated as quantitative information. In this regard, the generation of the first installation information can be realized by optics and geometry of the publicly known techniques and is not specific to the present embodiment and hence its detailed description will be omitted.

Hence, the range image camera system 1 can provide an installation worker with the range images 14a and 14b of the range image cameras 11a and 11b and the first installation information.

In this way, as for the first installation information of the range image cameras 11a and 11b, the installation worker can quantitatively get the installation state where the range image cameras 11a and 11b are installed as intended and hence can easily confirm that an installation work related to the first installation information is finished.

Figure 13A:
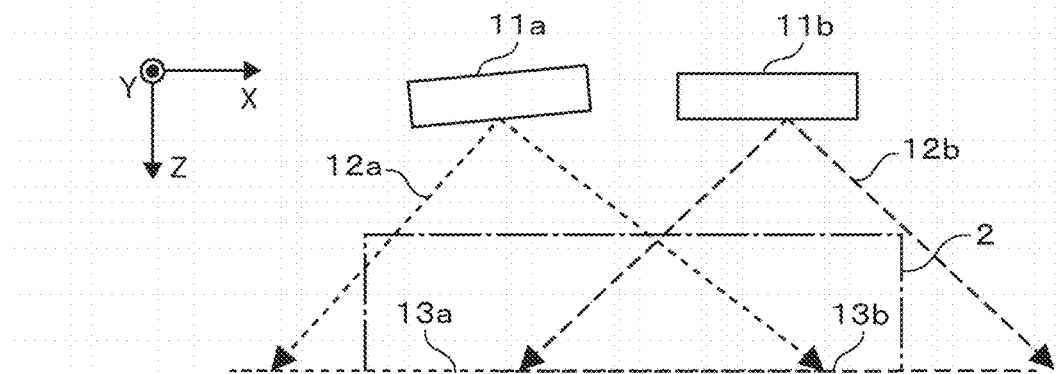
FIGS. 13(a)-13(c) are a side view of the photographing space and range images, respectively, in an installation state in which one of the range image cameras of the range image camera system in the embodiment 2 is installed in an inclined manner from an intended installation direction.
Figure 13B:
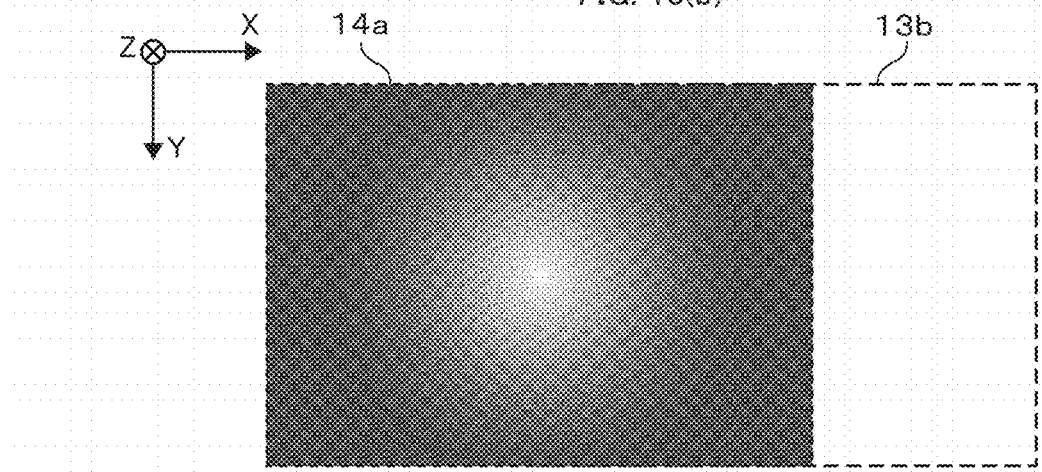
Figure 13C:
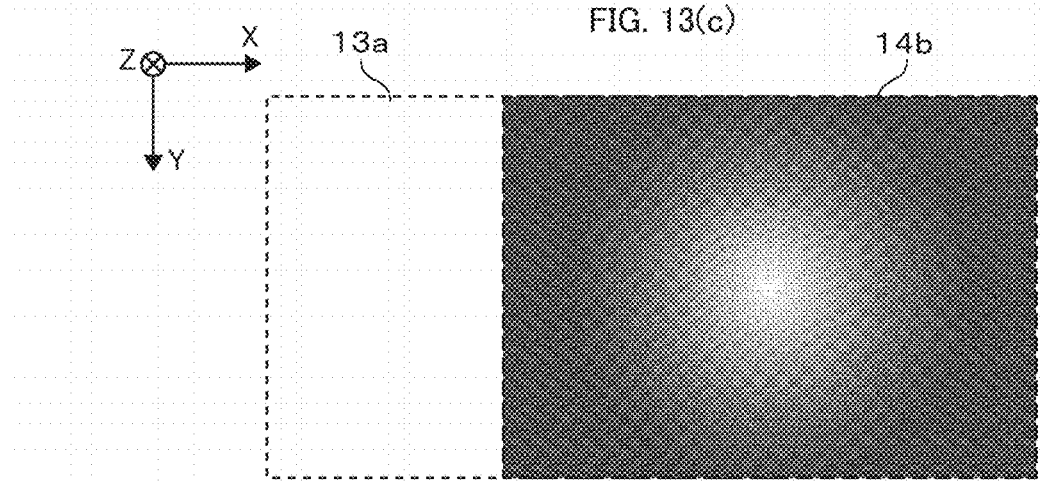

Next, an operation of a generation processing of the first installation information in a case where the range image camera in the range image camera system of the present embodiment is inclined from an intended installation direction will be described. FIGS. 13(a)-13(c) are a side view of the photographing space and range images, respectively, in the installation state where the range image cameras 11 (11a and 11b) in the range image camera system of the present embodiment are installed in an inclined manner from an intended installation direction.

In FIGS. 13(a)-13(c), the range image camera 11a is in an installation state where the range image camera 11a is inclined by a certain angle in a right direction from the intended installation direction with a positive direction of the Y axis defined as an axis of rotation, so it can be seen that a shortest position of the range image 14a is shifted in a negative direction of the X coordinate from a central position of the image.

In this way, as for the first installation information of the range camera 11a, the installation worker can quantitatively get the installation state where the range image cameras 11a is installed in a state inclined by a certain angle in a right direction in a Y axis rotation angle, in which the Y axis is defined as an axis of rotation, from an intended installation direction and hence can easily perform an installation adjustment work related to the first installation information.

In this regard, although the installation state where the range image camera 11a is installed in the inclined state with the Y axis defined as the axis of rotation has been described in FIGS. 13(a)-13(c), the same first installation information can be realized even in an installation state where the range image camera 11a is installed in the inclined state in an X axis rotation angle with the X axis defined as an axis of rotation. In other words, the first installation information is at least direction information of: the X axis rotation angle with the X axis in the photographing space coordinates of the range image camera defined as the axis of rotation; and the Y axis rotation angle with the Y axis in the photographing space coordinates of the range image camera defined as the axis of rotation.

Figure 14A:
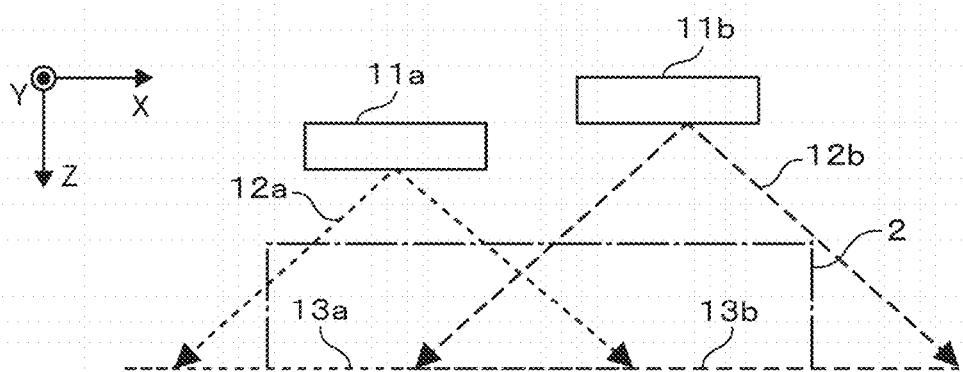
FIGS. 14(a)-14(c) are a side view of the photographing space and range images, respectively, in an installation state in which one of the range image cameras of the range image camera system in the embodiment 2 is installed at a position shifted from an intended installation position.
Figure 14B:
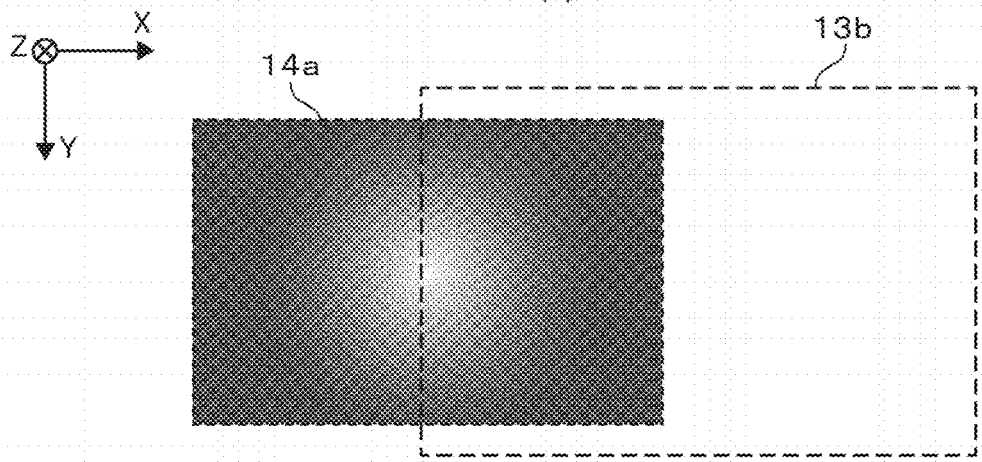
Figure 14C:
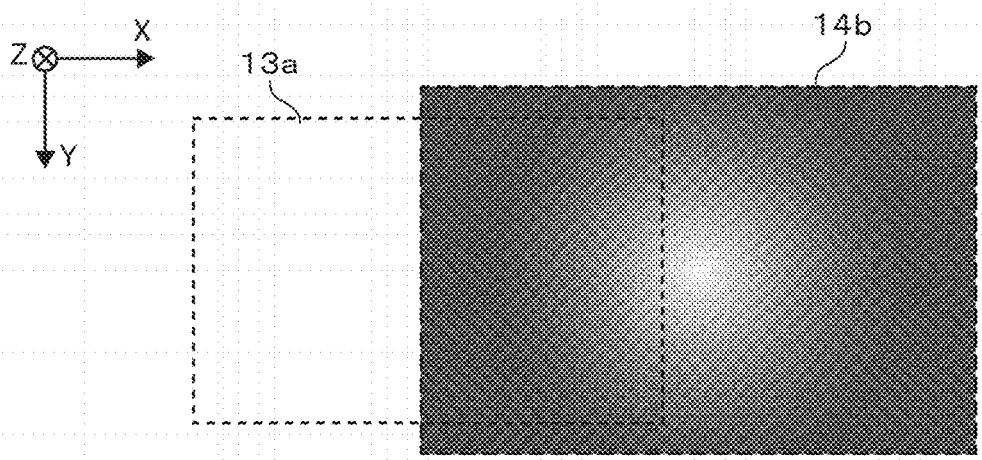

Further, there will be described an operation of a generation processing of the first installation information in a case of an installation state where the range image camera in the range image camera system of the present embodiment is installed at a position shifted from an intended installation position. FIGS. 14(a)-14(c) are a side view of the photographing space and range images, respectively, in the installation state where one of the range image cameras in the range image camera system of the present embodiment is installed shifted from the intended installation position.

In FIGS. 14(a)-14(c), the range image camera 11a is in an installation state where the range image camera 11a is shifted by a certain distance in a positive direction from the Z axis of the world coordinates from an intended installation position, so it can be seen that a distance of a central position of the range image 14a is shorter (lighter in the figure) as compared with a case where the range image camera 11a is in an intended installation state and that an increasing rate of the distance from a center to a periphery becomes smaller.

In other words, in FIGS. 14(a)-14(c), the first installation information becomes position information of a Z position of the range image camera that is a distance in the Z axis direction between a reference plane of a specified installation height of a floor or the like in the world space coordinates and the range image camera.

In this way, the installation worker can quantitatively get the installation state where the range image camera 11a is shifted by a certain distance in a positive direction of the Z axis of the world coordinates from an intended installation position as the first installation information of the range image camera 11a and hence can easily perform an installation adjustment work related to the first installation information.

Next, an operation of a generation processing of second installation information in the range image camera system of the present embodiment will be described.

First, the operation of the generation processing of second installation information in a case where the range image cameras 11 (11a and 11b) in the range image camera system of the present embodiment are installed as intended will be described.

Figure 15A:
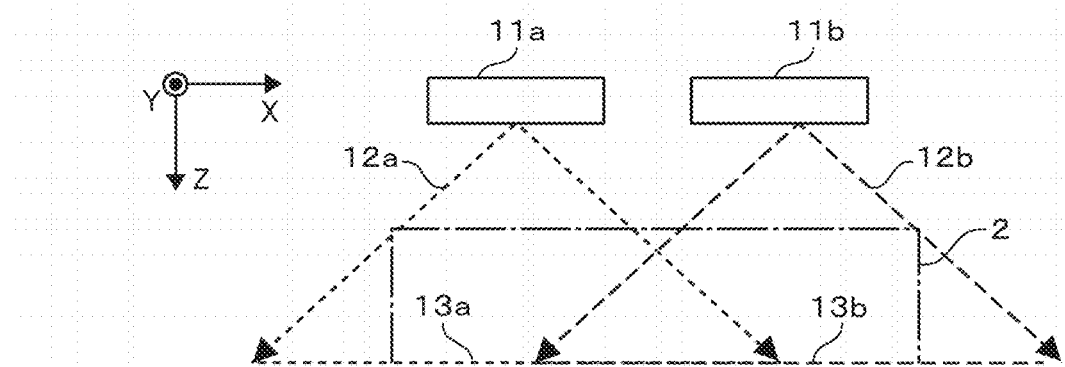
FIGS. 15(a)-15(c) are a side view of the photographing space and range images, respectively, in an installation state in which the range image cameras of the range image camera system in the embodiment 2 are installed as intended.
Figure 15B:
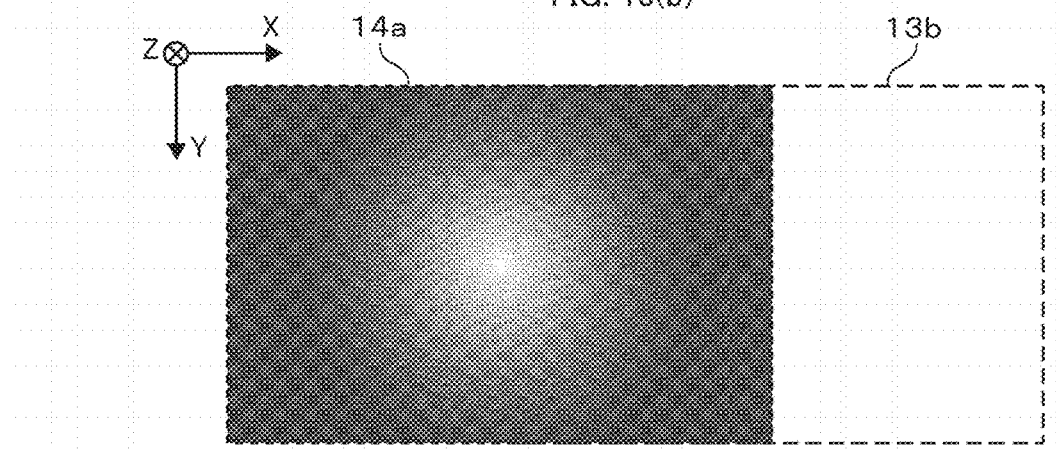
Figure 15C:
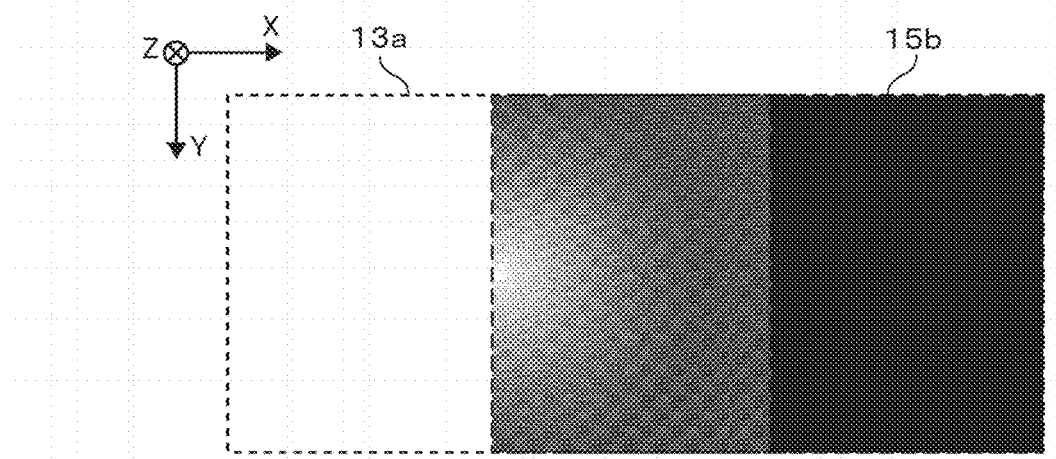

FIGS. 15(a)-15(c) are a side view of the photographing space and luminance images in the installation state where the range image cameras 11 (11a and 11b) in the range image camera system of the present embodiment are installed as intended.

Here, FIG. 15(a) is a side view of the photographing space and FIGS. 15(b) and 15(c) are luminance images 15a and 15b of the range image cameras 11a and 11b. Further, the luminance image 15a is generated by an instruction of the image generation execution mode for generating installation information. In other words, the range image camera 11b receives a reflected light by an irradiation light from the range image camera 11a and generates the luminance image 15b. Further, in the luminance images 15a and 15b in the figures, light and shade express short and long in a luminance.

As shown in FIGS. 15(a)-15(c), the range image cameras 11a and 11b are installed as intended, so in the luminance image 15a, the luminance is highest at the center and becomes lower radially from the center (changes from light to shade in the figures). Further, in the luminance image 15b, a region not overlapping the photographing plane 13a is never hit by the irradiation light and hence does never have the luminance (the figure is deep black in light and shade), whereas a region overlapping the photographing plane 13a is hit by the irradiation light of the range image camera 11a and hence has a luminance distribution depending on this irradiation light. It can be seen such a state that in this luminance distribution, the luminance is highest at the center in the photographing plane 13a and decreases radially from the center (changes from light to shade in the figure).

In the S560 of the generation processing of the second installation information described above, the second installation information of the information of whether or not the range image cameras 11a and 11b are shifted from the intended positions are generated as quantitative information. In this regard, the generation of the second installation information can be realized by optics and geometry of the publicly known techniques and is not specific to the present embodiment and hence its detailed description will be omitted.

Hence, the range image camera system 1 can provide the installation worker with the luminance images 15a and 15b of the range image cameras 11a and 11b and the second installation information.

In this way, as for the second installation information of the range image cameras 11a and 11b, the installation worker can quantitatively get the installation state where the range image cameras 11a and 11b are installed as intended and hence can easily confirm that an installation work related to the second installation information is finished.

Figure 16A:
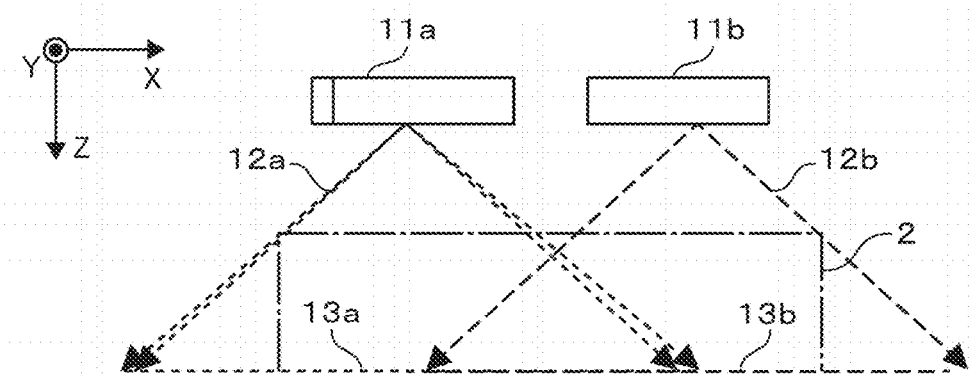
FIGS. 16(a)-16(c) are a side view of the photographing space and range images, respectively, in an installation state in which one of the range image cameras of the range image camera system in the embodiment 2 is installed in an inclined manner from the intended installation direction.
Figure 16B:
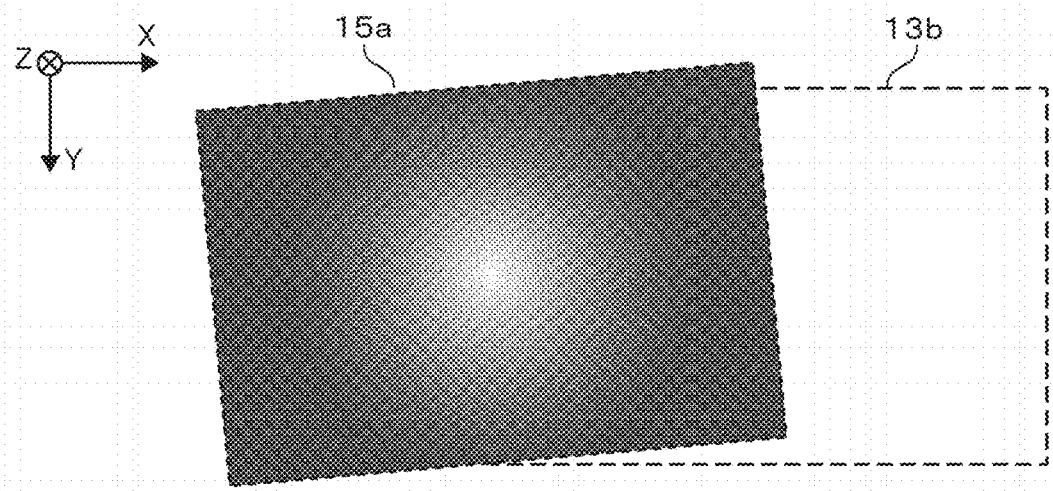
Figure 16C:
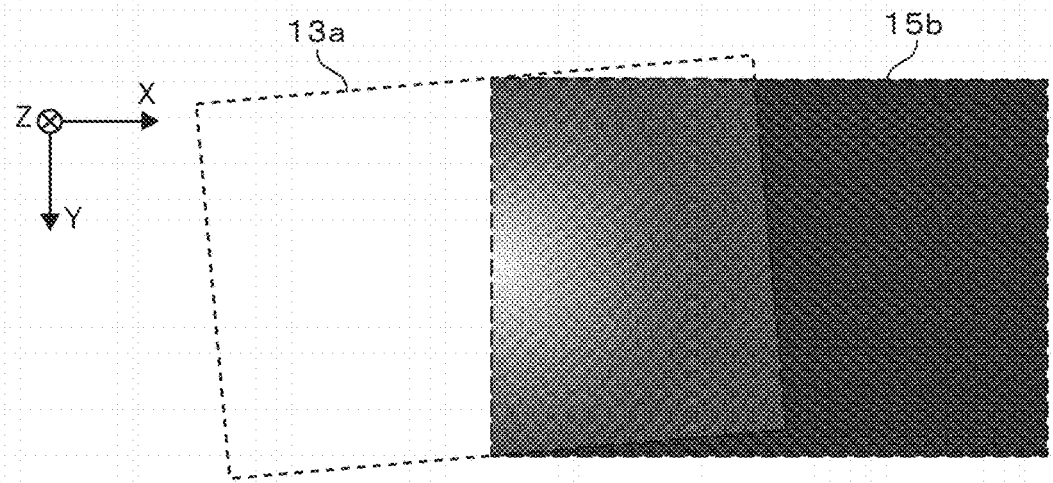

Next, the operation of the generation processing of the second installation information in a case where the range image camera in the range image camera system of the present embodiment is inclined from an intended installation direction will be described. FIGS. 16(a)-16(c) are a side view of the photographing space and luminance images, respectively, in the installation state where one of the range image cameras in the range image camera system of the present embodiment is installed in an inclined manner from the intended installation direction.

In FIGS. 16(a)-16(c), the range image camera 11a is in an installation state where the range image camera 11a is inclined by a certain angle in a counterclockwise direction with a positive direction of the Z axis defined as an axis of rotation from an intended installation direction, so it can be seen that a region in which the luminance of the luminance image 15b is significant is inclined in a counterclockwise direction with the Z axis of the photographing plane 13a defined as an axis of rotation.

In this way, as for the second installation information of the range camera 11a, the installation worker can quantitatively get the installation state where the range image cameras 11a is installed in a state inclined by a certain angle in the counterclockwise direction with the Z axis defined as an axis of rotation from an intended installation direction and hence can easily perform an installation adjustment work related to the second installation information.

In this regard, although the installation state where the range image camera 11a is installed in an inclined state with the Z axis defined as the axis of rotation has been described in FIGS. 16(a)-16(c), the same installation state can be realized even in an installation state where the range image camera 11a is installed in the inclined state with the X axis or the Y axis defined as an axis of rotation. In other words, the second installation information is at least direction information of: the X axis rotation angle with the X axis in the photographing space coordinates of the range image camera defined as the axis of rotation; the Y axis rotation angle with the Y axis in the photographing space coordinates of the range image camera defined as the axis of rotation; and the Z axis rotation angle with the Z axis in the photographing space coordinates of the range image camera defined as the axis of rotation.

In this regard, the luminance image 15b generated by receiving the reflected light by the irradiation light emitted from the range image camera installed adjacently does not become a parallelogram in a case where an irradiation range of the range image camera installed adjacently is a point light source. Hence, it is difficult to detect the luminance image 15b to be rotated but, by employing a plurality of point light sources or by making the irradiation range a parallelogram by the use of a mask, it is possible to detect the luminance image 15b to be rotated.

Figure 17A:
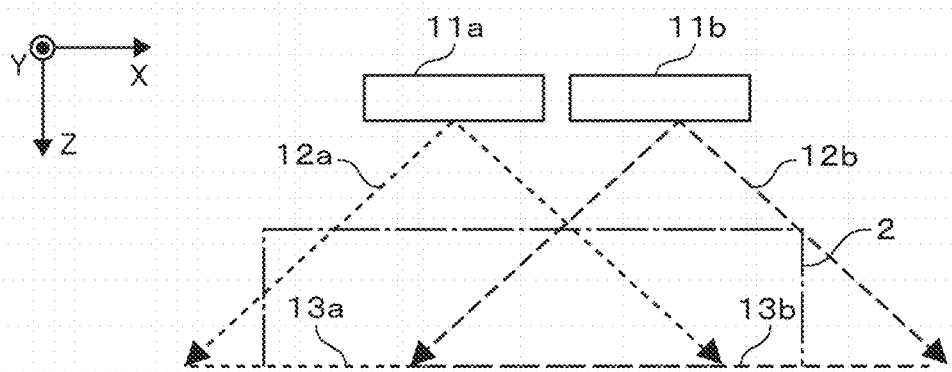
FIGS. 17(a)-17(c) are a side view of the photographing space and range images, respectively, in an installation state in which one of the range image cameras of the range image camera system in the embodiment 2 is installed at a position shifted from the intended installation position.
Figure 17B:
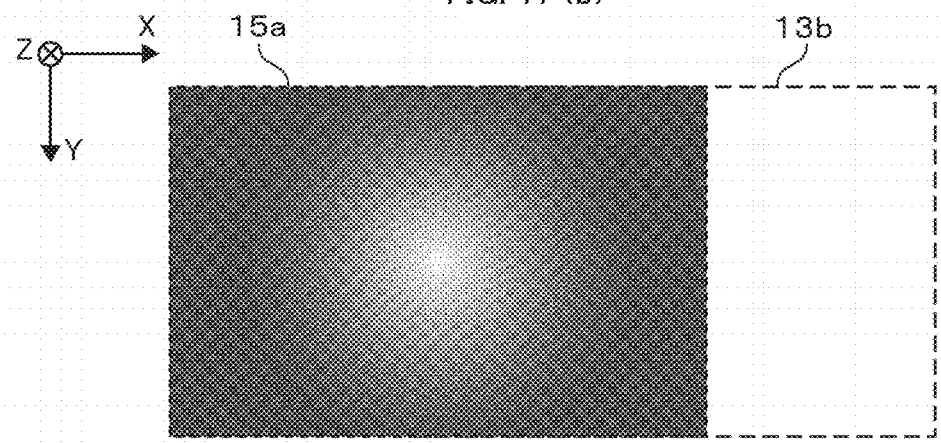
Figure 17C:
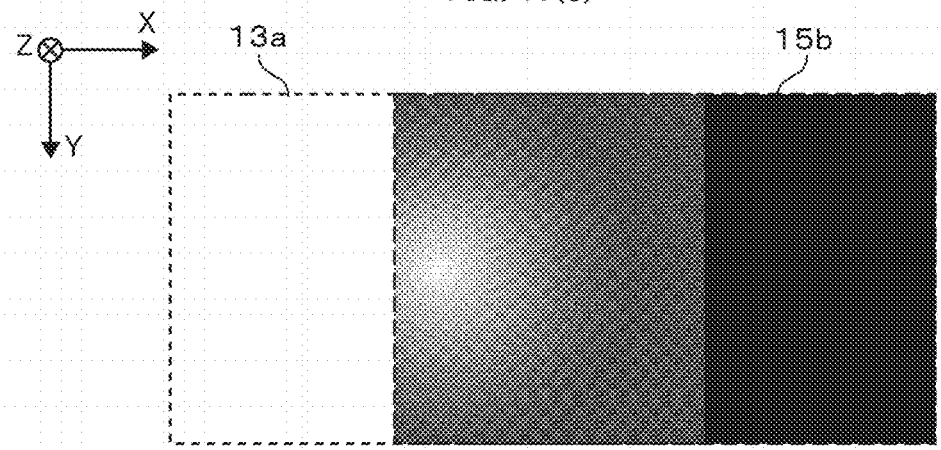

Further, there will be described the operation of the generation processing of the second installation information in a case of an installation state where the range image camera in the range image camera system of the present embodiment is shifted from an intended installation position. FIGS. 17(a)-17(c) are aside view of the photographing space and range images, respectively, in the installation state where one of the range image cameras in the range image camera system of the present embodiment is shifted from the intended installation direction.

In FIGS. 17(a)-17(c), the range image camera 11a is in an installation state where the range image camera 11a is shifted by a certain distance in a positive direction from the X axis of the world space coordinates from the intended installation position, so it can be seen that a range in which the luminance of the luminance image 15b is significant is shifted in the positive direction of the X axis of the photographing plane 13a.

In this way, as for the second installation information of the range image camera 11a, the installation worker can quantitatively get the installation state where the range image camera 11a is shifted by the certain distance in the positive direction of the X axis of the world coordinates from the intended installation position and hence can easily perform an installation adjustment work related to the second installation information.

In this regard, although the installation state where the range image camera 11a is shifted in the X direction has been described in FIGS. 17(a)-17(c), the same installation state can be realized even in an installation state where the range image camera 11a is shifted in the Y axis direction or in the Z axis direction. In other words, the second installation information is at least position information of: an X position of the range image camera, which is a distance between an installation position reference point of a specified position of the floor in the world space coordinates and the range image camera in the X axis direction; a Y position of the range image camera, which is a distance between the installation position reference point and the range image camera in the Y axis direction; and a Z axis position of the range image camera, which is a distance between the installation position reference point and the range image camera in the Z axis direction.

As described above, according to the present embodiment, the installation information of the range image cameras can be quantitatively generated, the installation worker can easily check an adjustment content of the installation work and that an adjustment work is finished.

Embodiment 3

In the present embodiment, a modification of a configuration described in the embodiments 1, 2 will be described.

First, as a configuration of the range image camera, the present embodiment may have a 3D image generation part that generates a 3D image from a range image generated by the range image generation part, and the control part may control the 3D image generation part and may instruct the 3D image generation part to execute a generation of a 3D image or to stop the generation of the 3D image in conjunction with an instruction of a generation execution or a generation stop of the range image to the range image generation part in the image generation execution mode.

Further, an original image used for generating the first installation information generated in the first cooperative installation information generation execution mode may be the 3D image or the luminance image in place of the range image.

Still further, as the configuration of the range image camera, the present embodiment may have at least one of: a first installation information generation part that generates the first installation information of the range image camera from at least one of the range image, the 3D image, and the luminance image; and a second installation information generation part that generates the second installation information of the range image camera from the luminance image, and the control part may control at least one of the first installation information generation part and the second installation information generation part, and the control part may have at least one of an image generation execution mode for generating installation information, a first installation information generation execution mode, and a second installation information generation execution mode as an installation information generation execution mode; and the control part may generate the first installation information of the range image camera from at least one image of the range image, the 3D image, and the luminance image as the first installation information generation execution mode and may generate the second installation information of the range image camera from the luminance image of the range image camera as the second installation information generation execution mode.

Still further, a mode instruction to an arbitrary range camera in a second cooperative installation information generation execution mode may be a light emission execution mode for generating installation information that gives at least one instruction of: an instruction of a light emission execution to the light emitting part; an instruction of a light emission stop to the light receiving part; and an instruction of a luminance image generation stop to the luminance image generating part, in place of the image generation execution mode.

Still further, at least installation information of the first installation information and the second installation information, which are generated by the range image camera cooperative processing device 12, may be generated by the range image camera and may be communicated with an exterior portion.

Up to this point, the embodiments have been described, and the present invention is not limited to the embodiments described above but includes various kinds of modifications. In other words, the above-mentioned embodiments have been described in detail so as to explain the present invention clearly and the present invention is not necessarily limited to an embodiment including all compositions described above. Further, a portion of a composition of a certain embodiment can be replaced by a composition of the other embodiment, and a composition of the other embodiment can be added to a composition of the certain embodiment. Still further, a composition of each embodiment can be added to, removed from, or replaced by a portion of a composition of the other embodiment. Still further, a portion or all of each composition, each function, each processing part, and each processing means described above may be realized, for example, by hardware designed by means of an integrated circuit or the like. Still further, each composition, each function, and the like may be realized by means of software in which a processor interprets and executes a program for realizing each function.

What is claimed is:

1. A range image camera comprising:
    a light emitting part that emits an irradiation light to a photographing space;
    a light receiving part that receives a reflected light of the photographing space;
    a range image generation part that generates a range image from a time difference between a light emitting timing of the irradiation light by the light emitting part and a light receiving timing of the reflected light by the light receiving part;
    a luminance image generation part that generates a luminance image from an intensity of the reflected light by the light receiving part; and
    a control part that controls the light emitting part, the light receiving part, the range image generation part, and the luminance image generation part,
    wherein the control part gives at least one instruction of an image generation execution of:
    an instruction of a light emission execution to the light emitting part;
    an instruction of a light reception execution to the light receiving part;
    an instruction of a range image generation execution to the range image generation part; and
    an instruction of a luminance image generation execution to the luminance image generation part, as an image generation execution mode,
    wherein the control part has at least one mode of:
    an image generation execution mode for generating installation information; and
    a light emission execution mode for generating installation information,
    wherein the control part gives at least one instruction of: an instruction of a light emission stop to the light emitting part; an instruction of a light reception execution to the light receiving part; and an instruction of a luminance image generation execution to the luminance image generation part, as the image generation execution mode for generating installation information,
    wherein the control part gives at least one instruction of: an instruction of a light emission execution to the light emitting part; an instruction of a light reception stop to the light receiving part; and an instruction of a luminance image generation stop to the luminance image generation part, as the light emission execution mode for generating installation information,
    wherein the range image camera further comprises a 3D image generation part that generates a 3D image from the range image,
    wherein the control part controls the 3D image generation part and gives an instruction of a generation stop or a generation execution of the 3D image to the 3D image generation part in conjunction with an instruction of a generation stop or a generation execution of the range image to the range image generation part,
    wherein the range image camera further comprises:
    a first installation information generation part that generates first installation information of the range image camera from at least one image of the range image, the 3D image, and the luminance image; and
    a second installation information generation part that generates second installation information of the range image camera from the luminance image,
    wherein the control part controls at least one of the first installation information generation part and the second installation information generation part,
    wherein the control part has at least one mode of: the image generation execution mode for generating installation information; a first installation information generation execution mode; and a second installation information generation execution mode, as an installation information generation execution mode,
    wherein the control part generates first installation information of the range image camera from at least one image of the range image, the 3D image, and the luminance image, as the first installation information generation execution mode; and
    wherein the control part generates second installation information of the range image camera from the luminance image of the range image camera as the second installation information generation execution mode.

2. The range image camera according to claim 1, wherein the first installation information is at least installation information of: at least direction information of an X axis rotation angle with an X axis in photographing space coordinates of the range image camera defined as an axis of rotation and a Y axis rotation angle with a Y axis in the photographing space coordinates of the range image camera defined as an axis of rotation; and position information that is a Z position of the range image camera that is a distance in a Z axis direction between a specified installation height reference surface in world space coordinates and the range image camera, and wherein the second installation information is at least installation information of: at least direction information of the X axis rotation angle with the X axis in the photographing space coordinates of the range image camera defined as the axis of rotation, the Y axis rotation angle with the Y axis in the photographing space coordinates of the range image camera defined as the axis of rotation, and the Z axis rotation angle with the Z axis in the photographing space coordinates of the range image camera defined as the axis of rotation; and at least position information of an X position, a Y position, and the Z position of the range image camera, which are distances between the installation position reference point at the specified position in the world space coordinates and the range image camera in an X axis direction, in a Y axis direction, and in the Z axis direction, respectively.

3. The range image camera according to claim 1, wherein the range image camera has a communication part that communicates with an external portion, wherein the control part of the range image camera controls the communication part, and wherein the communication part of the range image camera communicates at least one of the first installation information and the second installation information with the external portion.

4. A range image camera system comprising: a plurality of range image cameras and a range image camera cooperative processing device for cooperatively processing the plurality of range image cameras, wherein the range image camera comprises:
a light emitting part that emits an irradiation light to a photographing space;
a light receiving part that receives a reflected light of the photographing space:
a range image generation part that generates a range image from a time difference between a light emitting timing of the irradiation light by the light emitting part and a light receiving timing of the reflected light by the light receiving part;
a luminance image generation part that generates a luminance image from an intensity of the reflected light by the light receiving part; and
a control part that controls the light emitting part, the light receiving part, the range image generation part, and the luminance image generation part,
wherein the control part gives at least one instruction of an image generation execution of: an instruction of a light emission execution to the light emitting part, an instruction of a light reception execution to the light receiving part, an instruction of a range image generation execution to the range image generation part, and an instruction of a luminance image generation execution to the luminance image generation part, as an image generation execution mode,
wherein the control part has at least one mode of an image generation execution mode for generating installation information and a light emission execution mode for generating installation information, and gives at least one instruction of: an instruction of a light emission stop to the light emitting part, an instruction of a light reception execution to the light receiving part, and an instruction of a luminance image generation execution to the luminance image generation part, as the image generation execution mode for generating installation information, and gives at least one instruction of: an instruction of a light emission to the light emitting part, an instruction of a light reception stop to the light receiving part, and an instruction of a luminance image generation stop to the luminance image generation part, as the light emission execution mode for generating installation information, wherein the range image camera cooperative processing device gives a mode instruction of the image generation execution mode to the range image camera as a cooperative image generation execution mode, and has at least one mode of a first cooperative installation information generation execution mode and a second cooperative installation information generation execution mode as a cooperative installation information generation execution mode, and gives a mode instruction of the image generation execution mode to at least one range image camera as the first cooperative installation information generation execution mode, and gives a mode instruction of the image generation execution mode for generating installation information or the light emission execution mode for generating the installation information to at least one of the range image cameras as the second cooperative installation generation execution mode, wherein the range image camera cooperative processing device generates the first installation information of the range image camera from at least one image of the range image and the luminance image of the range image camera to instruct the image generation execution mode as the first cooperative installation information generation mode, and generates second installation information of the range image camera from a luminance image of the range image camera to instruct the image generation execution mode for generating installation information as the second cooperative installation information generation execution mode, wherein the first installation information is at least installation information of: at least direction information of an X axis rotation angle with an X axis in photographing space coordinates of the range image camera defined as an axis of rotation and a Y axis rotation angle with a Y axis in the photographing space coordinates of the range image camera defined as an axis of rotation; and position information that is a Z position of the range image camera that is a distance in a Z axis direction between a specified installation height reference surface in world space coordinates and the range image camera, and wherein the second installation information is at least installation information of: at least direction information of the X axis rotation angle with the X axis in the photographing space coordinates of the range image camera defined as the axis of rotation, the Y axis rotation angle with the Y axis in the photographing space coordinates of the range image camera defined as the axis of rotation, and the Z axis rotation angle with the Z axis in the photographing space coordinates of the range image camera defined as the axis of rotation; and at least position information of an X position, a Y position, and the Z position of the range image camera, which are distances between an installation position reference point at a specified position in the world space coordinates and the range image camera in an X axis direction, in a Y axis direction, and in the Z axis direction, respectively.

5. A control method of a range image camera, the control method comprising:

a light emitting step of emitting an irradiation light to a photographing space;

a light receiving step of receiving a reflected light of the photographing space:

a range image generation step of generating a range image from a time difference between a light emitting timing of the irradiation light in the light emitting step and a light receiving timing of the reflected light in the light receiving step;

a luminance image generation step of generating a luminance image from an intensity of the reflected light in the light receiving step; and a control step of controlling the light emitting step, the light receiving step, the range image generation step, and the luminance image generation step, wherein the control step gives at least one instruction of an image generation execution of: an instruction of a light emission to the light emitting step, an instruction of a light reception to the light receiving step, an instruction of a range image generation execution to the range image generation step, and an instruction of a luminance image generation execution to the luminance image generation step, as an image generation execution mode, wherein the control step has at least one mode of an image generation execution mode for generating installation information and a light emission execution mode for generating installation information, and gives at least one instruction of: an instruction of a light emission stop to the light emitting step; an instruction of a light reception execution to the light receiving step; and an instruction of a luminance image generation execution to the luminance image generation step, as the image generation execution mode for generating installation information, and gives at least one instruction of: an instruction of a light emission to the light emitting step, an instruction of a light reception stop to the light receiving step, and an instruction of a luminance image generation stop to the luminance image generation step, as the light emission execution mode for generating installation information wherein the method further comprises:

generating a 3D image from the range image, providing an instruction of a generation stop or a generation execution of the 3D image to the 3D image generation part in conjunction with an instruction of a generation stop or a generation execution of the range image to the range image generation part, generating first installation information of the range image camera from at least one image of the range image, the 3D image, and the luminance image; and generating second installation information of the range image camera from the luminance image, wherein the control step has at least one mode of: the image generation execution mode for generating installation information; a first installation information generation execution mode; and a second installation information generation execution mode, as an installation information generation execution mode, wherein the control step generates first installation information of the range image camera from at least one image of the range image, the 3D image, and the luminance image, as the first installation information generation execution mode; and wherein the control step generates second installation information of the range image camera from the luminance image of the range image camera as the second installation information generation execution mode.

6. A control method of a range image camera system including: a plurality of range image cameras and a range image camera cooperative processing device for cooperatively processing the plurality of range image cameras, wherein the method of the range image camera comprises:

a light emitting step of emitting an irradiation light to a photographing space;

a light receiving step of receiving a reflected light of the photographing space;

a range image generation step of generating a range image from a time difference between a light emitting timing of the irradiation light in the light emitting step and a light receiving timing of the reflected light in the light receiving step;

a luminance image generation step of generating a luminance image from an intensity of the reflected light in the light receiving step; and a control step of controlling the light emitting step, the light receiving step, the range image generation step, and the luminance image generation step, wherein the control step gives at least one instruction of an image generation execution of: an instruction of a light emission execution to the light emitting step; an instruction of a light reception execution to the light receiving step; an instruction of a range image generation execution to the range image generation step; and an instruction of a luminance image generation execution to the luminance image generation step, as an image generation execution mode, wherein the control step has at least one mode of an image generation execution mode for generating installation information and a light emission execution mode for generating installation information, and gives at least one instruction of: an instruction of a to the light emitting step; an instruction of a light reception execution to the light receiving step; and an instruction of a luminance image generation execution to the luminance image generation step, as the image generation execution mode for generating installation information, and gives at least one instruction of: an instruction of a light emission to the light emitting step; an instruction of a light reception stop to the light receiving step; and an instruction of a luminance image generation stop to the luminance image generation step, as the light emission execution mode for generating installation information, and wherein the range image camera cooperative processing device gives a mode instruction of the image generation execution mode to the range image camera as a cooperative image generation execution mode, and has at least one mode of: a first cooperative installation information generation execution mode; and a second cooperative installation information generation execution mode, as a cooperative installation information generation execution mode, and gives a mode instruction of the image generation execution mode to at least one range image camera as the first cooperative installation information generation execution mode, and gives a mode instruction of the image generation execution mode for generating installation information or the light emission execution mode for generating installation information to at least one of the range image cameras as the second cooperative installation generation execution mode, wherein the method further comprises generating first installation information of the range image camera from at least one image of the range image and the luminance image of the range image camera to instruct the image generation execution mode as the first cooperative installation information generation mode, and generating second installation information of the range image camera from a luminance image of the range image camera to instruct the image generation execution mode for generating installation information as the second cooperative installation information generation execution mode, wherein the first installation Information is at least installation information of: at least direction information of an X axis rotation angle with an X axis in photographing space coordinates of the range image camera defined as an axis of rotation and a Y axis rotation angle with a Y axis in the photographing space coordinates of the range image camera defined as an axis of rotation; and position information that is a Z position of the range image camera that is a distance in a Z axis direction between a specified installation height reference surface in world space coordinates and the range image camera, and wherein the second installation information is at least installation information of: at least direction information of the X axis rotation angle with the X axis in the photographing space coordinates of the range image camera defined as the axis of rotation, the Y axis rotation angle with the Y axis in the photographing space coordinates of the range image camera defined as the axis of rotation, and the Z axis rotation angle with the Z axis in the photographing space coordinates of the range image camera defined as the axis of rotation; and at least position information of an X position, a Y position, and the Z position of the range image camera, which are distances between an installation position reference point at a specified position in the world space coordinates and the range image camera in an X axis direction, in a Y axis direction, and in the Z axis direction, respectively.

* * * * *